(12) United States Patent
Botrel et al.

(10) Patent No.: US 7,785,075 B2
(45) Date of Patent: Aug. 31, 2010

(54) OPTIMIZED AERODYNAMIC PROFILE FOR A TURBINE BLADE

(75) Inventors: Erwan Daniel Botrel, Alfortville (FR); Gregory Pierre Lafarge, Choisy En Brie (FR); Philippe Picot, Le Chatelet En Brie (FR)

(73) Assignee: SNECMA, Paris (FR)

( * ) Notice: Subject to any disclaimer, the term of this patent is extended or adjusted under 35 U.S.C. 154(b) by 804 days.

(21) Appl. No.: 11/736,942

(22) Filed: Apr. 18, 2007

(65) Prior Publication Data

US 2007/0248465 A1 Oct. 25, 2007

(30) Foreign Application Priority Data

Apr. 20, 2006 (FR) .................................. 0651384

(51) Int. Cl.
*F01D 5/14* (2006.01)
(52) U.S. Cl. .............................. 416/223 A; 416/DIG. 2; 416/DIG. 5
(58) Field of Classification Search ............. 416/223 A, 416/243, DIG. 2, DIG. 5
See application file for complete search history.

(56) References Cited

U.S. PATENT DOCUMENTS

| | | | | |
|---|---|---|---|---|
| 6,779,980 | B1 * | 8/2004 | Brittingham et al. | ......... 416/243 |
| 6,808,368 | B1 * | 10/2004 | Tomberg et al. | ......... 416/223 A |
| 2004/0057833 | A1 * | 3/2004 | Arness et al. | ............... 416/243 |
| 2008/0206061 | A1 * | 8/2008 | Lafarge et al. | .......... 416/223 A |
| 2010/0040475 | A1 * | 2/2010 | Boquet et al. | ........... 416/223 R |

OTHER PUBLICATIONS

U.S. Appl. No. 12/035,136, filed Feb. 21, 2008, Lafarge et al.

* cited by examiner

*Primary Examiner*—Edward Look
*Assistant Examiner*—Ryan H Ellis
(74) *Attorney, Agent, or Firm*—Oblon, Spivak, McClelland, Maier & Neustadt, L.L.P.

(57) ABSTRACT

When cold and in the non-coated state, the aerodynamic profile is substantially identical to a nominal profile determined by the rectangular coordinates X,Y,Z' given in Table 1, in which the X coordinate is measured in the axial direction of the turbine, and the Z' coordinate is the quotient D/H, where D is the distance of the point in question from a reference plane P0 situated at the base of the nominal profile and H is the height of the profile measured from said reference plane to the tip of the blade, the measurements D and H being taken radially relative to the axis of the turbine.

9 Claims, 2 Drawing Sheets

OPTIMIZED AERODYNAMIC PROFILE FOR A TURBINE BLADE

The present invention relates to an aerodynamic profile for a turbine blade.

BACKGROUND OF THE INVENTION

In particular, the invention relates to the aerodynamic profile of a blade for a moving wheel of a gas turbine, and more particularly a high pressure turbine of the type used in an aircraft turbojet.

Such a profile must enable the turbine to provide the desired efficiency, and for that purpose it must be such that the flow of air around its profile is sound, i.e. such that it leads to substantially no turbulence that is harmful to overall efficiency. In addition, it must withstand high mechanical stresses and enable them to be distributed in the blade in such a manner as to avoid premature wear thereof. In other words, the aerodynamic profile must serve to optimize the aerodynamic and mechanical performance of the blade.

The profile must also be capable of being implanted properly on the root of a complete blade and must be capable of being manufactured without excessive difficulty. In particular, for the application to turbojets, the profile must enable a cooling circuit to be implanted so as to ensure thermal integrity of the blade, i.e. so as to avoid zones overheating, in the operating range of the turbojet.

OBJECT AND SUMMARY OF THE INVENTION

An object of the invention is to provide an optimized aerodynamic profile for a turbine blade that is capable of satisfying those objectives.

This object is achieved by the fact that when cold and in a non-coated state, said profile is substantially identical to a nominal profile determined by the rectangular coordinates X,Y,Z' given in Table 1, in which the X coordinate is measured in the axial direction of the turbine, and the Z' coordinate is the quotient D/H, where D is the distance of the point in question from a reference plane P0 situated at the base of the nominal profile and H is the height of the profile measured from said reference plane to the tip of the blade, the measurements D and H being taken radially relative to the axis of the turbine.

This profile has been determined after numerous tests and simulations. It is defined when cold, i.e. at an ambient temperature of 20° C. That is a reference temperature at which the profile is geometrically determined. The above-mentioned objectives of aerodynamic and mechanical optimization are naturally valid for the conditions of use of the aerodynamic profile, i.e. while hot, at a stabilized temperature when the engine of which the turbine forms a part is being used under cruising conditions.

Furthermore, the aerodynamic profile of the invention is defined in the non-coated state. Since turbine blades are subjected to high temperature gradients, it is common practice for them to be provided with a coating having thermal properties that enable the blades to withstand such temperature variations more easily. The profile is determined prior to applying such a coating.

It is stated above that the profile of the invention is "substantially identical" to the nominal profile. This means that the profile may depart very slightly from said nominal profile.

The aerodynamic profile is thus preferably defined within an envelope of ±1 millimeters (mm) in a direction normal to the surface of the nominal profile.

This variation serves, in particular, to accommodate tolerances in manufacturing the profile.

It is also preferable for the X,Y coordinates of the aerodynamic profile to lie within a range of ±5% relative to the X,Y coordinates of the nominal profile.

This variation accommodates setting the profile so as to match it to the flow coming from the nozzle situated upstream, thereby further improving the efficiency of the turbine.

BRIEF DESCRIPTION OF THE DRAWINGS

The invention can be well understood and its advantages appear more clearly on reading the following detailed description of an embodiment given by way of example. The description refers to the accompanying drawings, in which.

Figure 1:
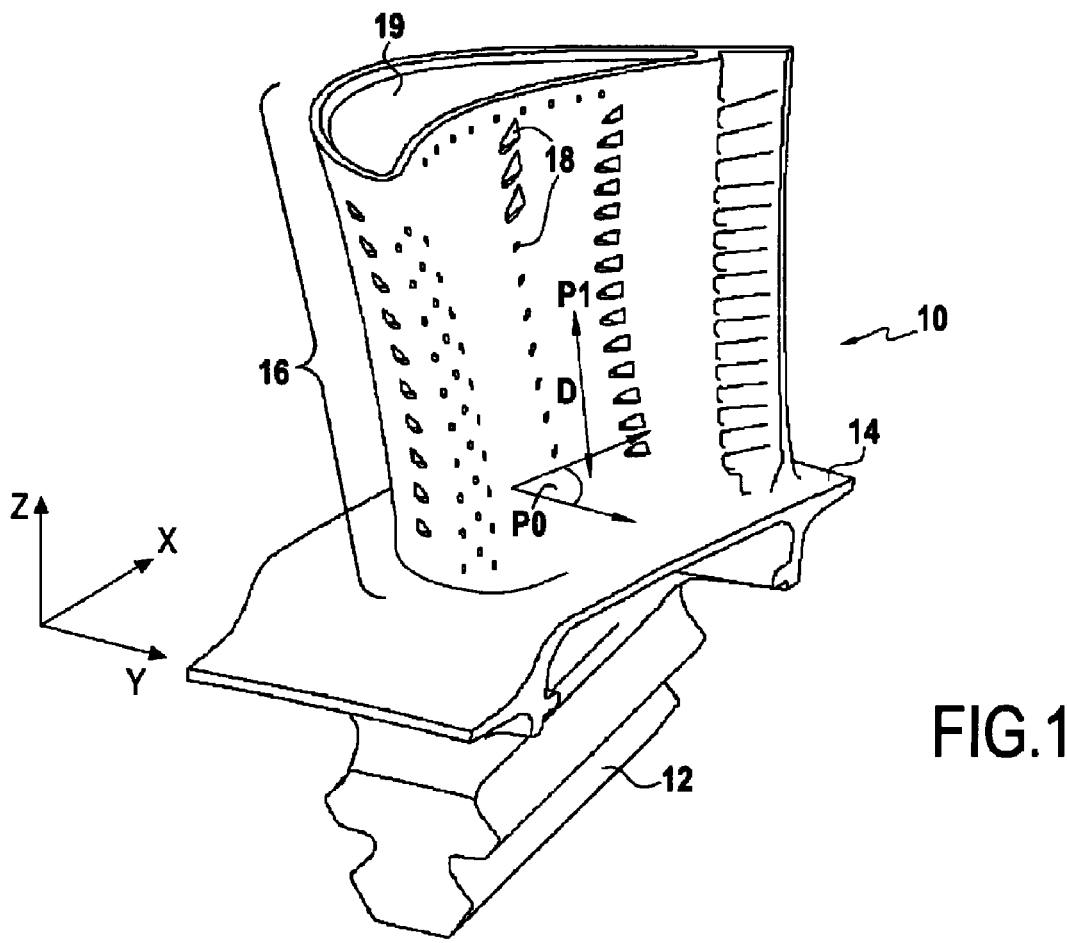
FIG. 1 is a perspective view of a blade to which the invention applies, the profile of the blade being shown over a fraction only of its height.

The blade 10 shown in FIG. 1 comprises a blade root 12 enabling it to be connected to the hub of a turbine wheel, and a platform 14 from which there extends an aerodynamic profile 16. By convention, the aerodynamic profile is the entire portion of the blade that extends radially outwards from the platform 14 to the tip of the blade.

MORE DETAILED DESCRIPTION

FIG. 1 shows a rectangular X,Y,Z frame of reference. The radial direction Z is the height direction of the blade, which extends radially, measured from the root of the blade towards the tip (not shown) of said blade. This Z direction is perpendicular to the axial direction X which is the direction of the axis of the wheel in which the blade is to be mounted. The Y direction is perpendicular to the X,Z plane. Since the wheel is a moving wheel, the X direction is the direction of the axis of rotation of the wheel, while the Y direction is the direction tangential to the rotation R of the wheel, with the Z direction being radial.

It can be seen that the profile is provided with openings 18 that connect its outside surface to the inside 19 of the profile, which may be hollow, so as to enable it to be cooled by circulating air.

The nominal profile from which the aerodynamic profile of the invention is determined is itself defined in the following table of coordinates, in which the coordinate Z', taken along the Z axis, is non-dimensional, and thus varies over the range 0 to 1, while the dimensions X and Y measured respectively along the axes X and Y are expressed in millimeters.

TABLE 1

| X | Y | Z' |
|---|---|---|
| −12.561 | −3.052 | 0.000 |
| −12.594 | −2.972 | 0.000 |
| −12.630 | −2.851 | 0.000 |

TABLE 1-continued

| X | Y | Z' |
|---|---|---|
| −12.661 | −2.658 | 0.000 |
| −12.664 | −2.386 | 0.000 |
| −12.620 | −2.034 | 0.000 |
| −12.528 | −1.600 | 0.000 |
| −12.387 | −1.084 | 0.000 |
| −12.185 | −0.488 | 0.000 |
| −11.902 | 0.178 | 0.000 |
| −11.521 | 0.903 | 0.000 |
| −11.023 | 1.667 | 0.000 |
| −10.394 | 2.449 | 0.000 |
| −9.628 | 3.226 | 0.000 |
| −8.721 | 3.973 | 0.000 |
| −7.678 | 4.668 | 0.000 |
| −6.508 | 5.294 | 0.000 |
| −5.224 | 5.834 | 0.000 |
| −3.838 | 6.271 | 0.000 |
| −2.367 | 6.585 | 0.000 |
| −0.827 | 6.747 | 0.000 |
| 0.756 | 6.692 | 0.000 |
| 2.334 | 6.368 | 0.000 |
| 3.848 | 5.766 | 0.000 |
| 5.249 | 4.917 | 0.000 |
| 6.514 | 3.874 | 0.000 |
| 7.648 | 2.701 | 0.000 |
| 8.662 | 1.446 | 0.000 |
| 9.569 | 0.143 | 0.000 |
| 10.381 | −1.181 | 0.000 |
| 11.109 | −2.503 | 0.000 |
| 11.764 | −3.806 | 0.000 |
| 12.354 | −5.075 | 0.000 |
| 12.888 | −6.297 | 0.000 |
| 13.370 | −7.464 | 0.000 |
| 13.806 | −8.565 | 0.000 |
| 14.200 | −9.593 | 0.000 |
| 14.558 | −10.542 | 0.000 |
| 14.881 | −11.409 | 0.000 |
| 15.189 | −12.182 | 0.000 |
| 15.481 | −12.861 | 0.000 |
| 15.740 | −13.453 | 0.000 |
| 15.957 | −13.962 | 0.000 |
| 16.131 | −14.390 | 0.000 |
| 16.266 | −14.742 | 0.000 |
| 16.366 | −15.020 | 0.000 |
| 16.417 | −15.233 | 0.000 |
| 16.378 | −15.380 | 0.000 |
| 16.316 | −15.455 | 0.000 |
| 16.254 | −15.496 | 0.000 |
| 16.205 | −15.515 | 0.000 |
| 16.136 | −15.525 | 0.000 |
| 16.028 | −15.506 | 0.000 |
| 15.903 | −15.411 | 0.000 |
| 15.787 | −15.233 | 0.000 |
| 15.648 | −15.000 | 0.000 |
| 15.480 | −14.713 | 0.000 |
| 15.277 | −14.371 | 0.000 |
| 15.034 | −13.975 | 0.000 |
| 14.747 | −13.528 | 0.000 |
| 14.412 | −13.031 | 0.000 |
| 14.025 | −12.491 | 0.000 |
| 13.582 | −11.910 | 0.000 |
| 13.080 | −11.298 | 0.000 |
| 12.515 | −10.660 | 0.000 |
| 11.886 | −10.007 | 0.000 |
| 11.200 | −9.336 | 0.000 |
| 10.462 | −8.651 | 0.000 |
| 9.657 | −7.978 | 0.000 |
| 8.773 | −7.350 | 0.000 |
| 7.814 | −6.777 | 0.000 |
| 6.800 | −6.252 | 0.000 |
| 5.738 | −5.782 | 0.000 |
| 4.639 | −5.372 | 0.000 |
| 3.510 | −5.026 | 0.000 |
| 2.364 | −4.746 | 0.000 |
| 1.211 | −4.533 | 0.000 |
| 0.061 | −4.386 | 0.000 |
| −1.076 | −4.295 | 0.000 |
| −2.190 | −4.252 | 0.000 |
| −3.272 | −4.255 | 0.000 |
| −4.317 | −4.301 | 0.000 |
| −5.315 | −4.387 | 0.000 |
| −6.263 | −4.498 | 0.000 |
| −7.158 | −4.616 | 0.000 |
| −7.997 | −4.718 | 0.000 |
| −8.780 | −4.771 | 0.000 |
| −9.502 | −4.753 | 0.000 |
| −10.151 | −4.663 | 0.000 |
| −10.721 | −4.514 | 0.000 |
| −11.207 | −4.329 | 0.000 |
| −11.606 | −4.115 | 0.000 |
| −11.916 | −3.888 | 0.000 |
| −12.147 | −3.668 | 0.000 |
| −12.310 | −3.471 | 0.000 |
| −12.420 | −3.310 | 0.000 |
| −12.492 | −3.189 | 0.000 |
| −12.534 | −3.108 | 0.000 |
| −12.446 | −2.811 | 0.046 |
| −12.483 | −2.732 | 0.046 |
| −12.525 | −2.612 | 0.046 |
| −12.565 | −2.421 | 0.046 |
| −12.581 | −2.150 | 0.046 |
| −12.553 | −1.795 | 0.046 |
| −12.475 | −1.358 | 0.046 |
| −12.344 | −0.838 | 0.046 |
| −12.148 | −0.239 | 0.046 |
| −11.871 | 0.431 | 0.046 |
| −11.494 | 1.159 | 0.046 |
| −11.004 | 1.930 | 0.046 |
| −10.387 | 2.724 | 0.046 |
| −9.635 | 3.517 | 0.046 |
| −8.745 | 4.286 | 0.046 |
| −7.718 | 5.009 | 0.046 |
| −6.563 | 5.666 | 0.046 |
| −5.289 | 6.236 | 0.046 |
| −3.909 | 6.697 | 0.046 |
| −2.437 | 7.023 | 0.046 |
| −0.894 | 7.177 | 0.046 |
| 0.690 | 7.097 | 0.046 |
| 2.263 | 6.738 | 0.046 |
| 3.765 | 6.101 | 0.046 |
| 5.150 | 5.221 | 0.046 |
| 6.398 | 4.153 | 0.046 |
| 7.515 | 2.960 | 0.046 |
| 8.513 | 1.689 | 0.046 |
| 9.405 | 0.372 | 0.046 |
| 10.204 | −0.962 | 0.046 |
| 10.922 | −2.293 | 0.046 |
| 11.570 | −3.602 | 0.046 |
| 12.154 | −4.876 | 0.046 |
| 12.684 | −6.103 | 0.046 |
| 13.164 | −7.272 | 0.046 |
| 13.600 | −8.375 | 0.046 |
| 13.995 | −9.405 | 0.046 |
| 14.354 | −10.356 | 0.046 |
| 14.678 | −11.224 | 0.046 |
| 14.986 | −11.998 | 0.046 |
| 15.278 | −12.679 | 0.046 |
| 15.536 | −13.271 | 0.046 |
| 15.753 | −13.781 | 0.046 |
| 15.928 | −14.211 | 0.046 |
| 16.062 | −14.563 | 0.046 |
| 16.161 | −14.842 | 0.046 |
| 16.213 | −15.056 | 0.046 |
| 16.174 | −15.203 | 0.046 |
| 16.112 | −15.277 | 0.046 |
| 16.050 | −15.319 | 0.046 |
| 16.001 | −15.337 | 0.046 |
| 15.933 | −15.348 | 0.046 |
| 15.825 | −15.330 | 0.046 |
| 15.700 | −15.237 | 0.046 |
| 15.584 | −15.061 | 0.046 |
| 15.444 | −14.830 | 0.046 |
| 15.275 | −14.546 | 0.046 |
| 15.072 | −14.207 | 0.046 |
| 14.830 | −13.814 | 0.046 |

TABLE 1-continued

| X | Y | Z' |
|---|---|---|
| 14.545 | −13.369 | 0.046 |
| 14.213 | −12.875 | 0.046 |
| 13.832 | −12.335 | 0.046 |
| 13.397 | −11.754 | 0.046 |
| 12.907 | −11.139 | 0.046 |
| 12.357 | −10.496 | 0.046 |
| 11.744 | −9.834 | 0.046 |
| 11.078 | −9.151 | 0.046 |
| 10.364 | −8.451 | 0.046 |
| 9.586 | −7.758 | 0.046 |
| 8.730 | −7.101 | 0.046 |
| 7.799 | −6.498 | 0.046 |
| 6.812 | −5.938 | 0.046 |
| 5.776 | −5.430 | 0.046 |
| 4.699 | −4.981 | 0.046 |
| 3.592 | −4.596 | 0.046 |
| 2.463 | −4.279 | 0.046 |
| 1.324 | −4.032 | 0.046 |
| 0.185 | −3.856 | 0.046 |
| −0.942 | −3.743 | 0.046 |
| −2.048 | −3.686 | 0.046 |
| −3.124 | −3.683 | 0.046 |
| −4.162 | −3.729 | 0.046 |
| −5.154 | −3.816 | 0.046 |
| −6.095 | −3.934 | 0.046 |
| −6.982 | −4.065 | 0.046 |
| −7.813 | −4.187 | 0.046 |
| −8.589 | −4.271 | 0.046 |
| −9.306 | −4.294 | 0.046 |
| −9.956 | −4.247 | 0.046 |
| −10.531 | −4.140 | 0.046 |
| −11.026 | −3.989 | 0.046 |
| −11.437 | −3.807 | 0.046 |
| −11.761 | −3.603 | 0.046 |
| −12.003 | −3.400 | 0.046 |
| −12.177 | −3.215 | 0.046 |
| −12.295 | −3.060 | 0.046 |
| −12.371 | −2.944 | 0.046 |
| −12.417 | −2.866 | 0.046 |
| −12.353 | −2.585 | 0.084 |
| −12.393 | −2.508 | 0.084 |
| −12.439 | −2.390 | 0.084 |
| −12.487 | −2.200 | 0.084 |
| −12.514 | −1.929 | 0.084 |
| −12.500 | −1.573 | 0.084 |
| −12.433 | −1.133 | 0.084 |
| −12.310 | −0.610 | 0.084 |
| −12.120 | −0.009 | 0.084 |
| −11.845 | 0.664 | 0.084 |
| −11.473 | 1.396 | 0.084 |
| −10.990 | 2.174 | 0.084 |
| −10.383 | 2.977 | 0.084 |
| −9.643 | 3.784 | 0.084 |
| −8.767 | 4.572 | 0.084 |
| −7.754 | 5.318 | 0.084 |
| −6.611 | 6.001 | 0.084 |
| −5.346 | 6.596 | 0.084 |
| −3.971 | 7.077 | 0.084 |
| −2.499 | 7.412 | 0.084 |
| −0.953 | 7.560 | 0.084 |
| 0.633 | 7.459 | 0.084 |
| 2.202 | 7.073 | 0.084 |
| 3.694 | 6.407 | 0.084 |
| 5.067 | 5.502 | 0.084 |
| 6.301 | 4.415 | 0.084 |
| 7.405 | 3.206 | 0.084 |
| 8.391 | 1.921 | 0.084 |
| 9.272 | 0.594 | 0.084 |
| 10.062 | −0.749 | 0.084 |
| 10.772 | −2.086 | 0.084 |
| 11.413 | −3.401 | 0.084 |
| 11.994 | −4.679 | 0.084 |
| 12.521 | −5.910 | 0.084 |
| 13.000 | −7.081 | 0.084 |
| 13.435 | −8.187 | 0.084 |
| 13.831 | −9.219 | 0.084 |
| 14.191 | −10.171 | 0.084 |

TABLE 1-continued

| X | Y | Z' |
|---|---|---|
| 14.516 | −11.040 | 0.084 |
| 14.825 | −11.816 | 0.084 |
| 15.117 | −12.498 | 0.084 |
| 15.375 | −13.092 | 0.084 |
| 15.592 | −13.603 | 0.084 |
| 15.766 | −14.033 | 0.084 |
| 15.900 | −14.386 | 0.084 |
| 15.999 | −14.665 | 0.084 |
| 16.051 | −14.880 | 0.084 |
| 16.013 | −15.027 | 0.084 |
| 15.950 | −15.102 | 0.084 |
| 15.889 | −15.143 | 0.084 |
| 15.840 | −15.162 | 0.084 |
| 15.772 | −15.173 | 0.084 |
| 15.664 | −15.155 | 0.084 |
| 15.539 | −15.064 | 0.084 |
| 15.422 | −14.889 | 0.084 |
| 15.283 | −14.660 | 0.084 |
| 15.113 | −14.378 | 0.084 |
| 14.909 | −14.041 | 0.084 |
| 14.667 | −13.651 | 0.084 |
| 14.383 | −13.208 | 0.084 |
| 14.054 | −12.715 | 0.084 |
| 13.677 | −12.176 | 0.084 |
| 13.249 | −11.594 | 0.084 |
| 12.767 | −10.976 | 0.084 |
| 12.228 | −10.328 | 0.084 |
| 11.629 | −9.659 | 0.084 |
| 10.978 | −8.969 | 0.084 |
| 10.282 | −8.256 | 0.084 |
| 9.526 | −7.546 | 0.084 |
| 8.693 | −6.868 | 0.084 |
| 7.784 | −6.240 | 0.084 |
| 6.818 | −5.653 | 0.084 |
| 5.803 | −5.116 | 0.084 |
| 4.745 | −4.636 | 0.084 |
| 3.655 | −4.221 | 0.084 |
| 2.540 | −3.874 | 0.084 |
| 1.413 | −3.599 | 0.084 |
| 0.283 | −3.399 | 0.084 |
| −0.838 | −3.269 | 0.084 |
| −1.938 | −3.202 | 0.084 |
| −3.009 | −3.193 | 0.084 |
| −4.043 | −3.238 | 0.084 |
| −5.030 | −3.328 | 0.084 |
| −5.967 | −3.451 | 0.084 |
| −6.848 | −3.590 | 0.084 |
| −7.673 | −3.727 | 0.084 |
| −8.443 | −3.834 | 0.084 |
| −9.155 | −3.888 | 0.004 |
| −9.804 | −3.876 | 0.084 |
| −10.382 | −3.802 | 0.084 |
| −10.883 | −3.681 | 0.084 |
| −11.301 | −3.524 | 0.084 |
| −11.635 | −3.341 | 0.084 |
| −11.887 | −3.152 | 0.084 |
| −12.069 | −2.976 | 0.084 |
| −12.193 | −2.828 | 0.084 |
| −12.274 | −2.715 | 0.084 |
| −12.322 | −2.639 | 0.084 |
| −12.233 | −2.361 | 0.128 |
| −12.276 | −2.285 | 0.128 |
| −12.328 | −2.169 | 0.128 |
| −12.385 | −1.981 | 0.128 |
| −12.426 | −1.711 | 0.128 |
| −12.428 | −1.354 | 0.128 |
| −12.375 | −0.912 | 0.128 |
| −12.261 | −0.386 | 0.128 |
| −12.076 | 0.219 | 0.128 |
| −11.807 | 0.895 | 0.128 |
| −11.440 | 1.633 | 0.128 |
| −10.966 | 2.418 | 0.128 |
| −10.371 | 3.233 | 0.128 |
| −9.647 | 4.057 | 0.128 |
| −8.787 | 4.868 | 0.128 |
| −7.792 | 5.642 | 0.128 |
| −6.665 | 6.356 | 0.128 |

TABLE 1-continued

| X | Y | Z' |
|---|---|---|
| −5.411 | 6.981 | 0.128 |
| −4.041 | 7.485 | 0.128 |
| −2.568 | 7.832 | 0.128 |
| −1.018 | 7.971 | 0.128 |
| 0.570 | 7.847 | 0.128 |
| 2.134 | 7.429 | 0.128 |
| 3.615 | 6.730 | 0.128 |
| 4.973 | 5.796 | 0.128 |
| 6.193 | 4.686 | 0.128 |
| 7.281 | 3.459 | 0.128 |
| 8.253 | 2.159 | 0.128 |
| 9.121 | 0.819 | 0.128 |
| 9.900 | −0.534 | 0.128 |
| 10.602 | −1.880 | 0.128 |
| 11.237 | −3.202 | 0.128 |
| 11.813 | −4.486 | 0.128 |
| 12.337 | −5.721 | 0.128 |
| 12.814 | −6.897 | 0.128 |
| 13.250 | −8.005 | 0.128 |
| 13.646 | −9.039 | 0.128 |
| 14.007 | −9.994 | 0.128 |
| 14.333 | −10.855 | 0.128 |
| 14.643 | −11.642 | 0.128 |
| 14.935 | −12.326 | 0.128 |
| 15.193 | −12.921 | 0.128 |
| 15.410 | −13.433 | 0.128 |
| 16.584 | −13.865 | 0.128 |
| 15.718 | −14.220 | 0.128 |
| 15.817 | −14.499 | 0.128 |
| 15.859 | −14.714 | 0.128 |
| 15.831 | −14.862 | 0.128 |
| 15.769 | −14.937 | 0.128 |
| 15.707 | −14.979 | 0.128 |
| 15.658 | −14.997 | 0.128 |
| 15.591 | −15.008 | 0.128 |
| 15.484 | −14.991 | 0.128 |
| 15.358 | −14.901 | 0.128 |
| 15.241 | −14.728 | 0.128 |
| 15.100 | −14.501 | 0.128 |
| 14.929 | −14.221 | 0.128 |
| 14.725 | −13.887 | 0.128 |
| 14.484 | −13.499 | 0.128 |
| 14.201 | −13.058 | 0.128 |
| 13.874 | −12.567 | 0.128 |
| 13.502 | −12.028 | 0.128 |
| 13.081 | −11.445 | 0.128 |
| 12.609 | −10.824 | 0.128 |
| 12.082 | −10.170 | 0.128 |
| 11.499 | −9.493 | 0.128 |
| 10.866 | −8.792 | 0.128 |
| 10.192 | −8.065 | 0.128 |
| 9.460 | −7.336 | 0.128 |
| 8.654 | −6.633 | 0.128 |
| 7.771 | −5.978 | 0.128 |
| 6.831 | −5.359 | 0.128 |
| 5.841 | −4.787 | 0.128 |
| 4.806 | −4.272 | 0.128 |
| 3.735 | −3.820 | 0.128 |
| 2.638 | −3.438 | 0.128 |
| 1.524 | −3.132 | 0.128 |
| 0.405 | −2.904 | 0.128 |
| −0.708 | −2.753 | 0.128 |
| −1.803 | −2.673 | 0.128 |
| −2.869 | −2.658 | 0.128 |
| −3.898 | −2.701 | 0.128 |
| −4.881 | −2.793 | 0.128 |
| −5.812 | −2.922 | 0.128 |
| −6.688 | −3.071 | 0.128 |
| −7.507 | −3.223 | 0.128 |
| −8.268 | −3.366 | 0.128 |
| −8.974 | −3.443 | 0.128 |
| −9.620 | −3.472 | 0.128 |
| −10.199 | −3.439 | 0.128 |
| −10.705 | −3.353 | 0.128 |
| −11.132 | −3.227 | 0.128 |
| −11.476 | −3.069 | 0.128 |
| −11.740 | −2.899 | 0.128 |

TABLE 1-continued

| X | Y | Z' |
|---|---|---|
| −11.931 | −2.736 | 0.128 |
| −12.063 | −2.595 | 0.128 |
| −12.148 | −2.487 | 0.128 |
| −12.200 | −2.413 | 0.128 |
| −12.095 | −2.231 | 0.172 |
| −12.142 | −2.157 | 0.172 |
| −12.199 | −2.043 | 0.172 |
| −12.266 | −1.858 | 0.172 |
| −12.321 | −1.590 | 0.172 |
| −12.340 | −1.233 | 0.172 |
| −12.301 | −0.788 | 0.172 |
| −12.196 | −0.259 | 0.172 |
| −12.017 | 0.350 | 0.172 |
| −11.753 | 1.030 | 0.172 |
| −11.392 | 1.773 | 0.172 |
| −10.926 | 2.566 | 0.172 |
| −10.344 | 3.394 | 0.172 |
| −9.636 | 4.235 | 0.172 |
| −8.794 | 5.069 | 0.172 |
| −7.818 | 5.872 | 0.172 |
| −6.707 | 6.616 | 0.172 |
| −5.464 | 7.271 | 0.172 |
| −4.099 | 7.800 | 0.172 |
| −2.625 | 8.157 | 0.172 |
| −1.070 | 8.290 | 0.172 |
| 0.519 | 8.142 | 0.172 |
| 2.019 | 7.692 | 0.172 |
| 3.550 | 6.961 | 0.172 |
| 4.893 | 5.999 | 0.172 |
| 6.098 | 4.867 | 0.172 |
| 7.172 | 3.621 | 0.172 |
| 8.129 | 2.305 | 0.172 |
| 8.986 | 0.953 | 0.172 |
| 9.754 | −0.411 | 0.172 |
| 10.447 | −1.766 | 0.172 |
| 11.076 | −3.095 | 0.172 |
| 11.648 | −4.385 | 0.172 |
| 12.169 | −5.625 | 0.172 |
| 12.646 | −6.804 | 0.172 |
| 13.081 | −7.916 | 0.172 |
| 13.479 | −8.953 | 0.172 |
| 13.841 | −9.910 | 0.172 |
| 14.168 | −10.783 | 0.172 |
| 14.479 | −11.562 | 0.172 |
| 14.772 | −12.241 | 0.172 |
| 15.030 | −12.845 | 0.172 |
| 15.247 | −13.359 | 0.172 |
| 15.421 | −13.792 | 0.172 |
| 15.555 | −14.147 | 0.172 |
| 15.654 | −14.428 | 0.172 |
| 15.707 | −14.643 | 0.172 |
| 15.669 | −14.791 | 0.172 |
| 15.607 | −14.866 | 0.172 |
| 15.545 | −14.908 | 0.172 |
| 15.496 | −14.927 | 0.172 |
| 15.429 | −14.938 | 0.172 |
| 15.322 | −14.922 | 0.172 |
| 15.196 | −14.833 | 0.172 |
| 15.079 | −14.661 | 0.172 |
| 14.937 | −14.436 | 0.172 |
| 14.765 | −14.158 | 0.172 |
| 14.560 | −13.826 | 0.172 |
| 14.318 | −13.440 | 0.172 |
| 14.036 | −13.001 | 0.172 |
| 13.712 | −12.511 | 0.172 |
| 13.344 | −11.971 | 0.172 |
| 12.929 | −11.387 | 0.172 |
| 12.486 | −10.762 | 0.172 |
| 11.951 | −10.104 | 0.172 |
| 11.383 | −9.418 | 0.172 |
| 10.767 | −8.705 | 0.172 |
| 10.114 | −7.964 | 0.172 |
| 9.407 | −7.216 | 0.172 |
| 8.626 | −6.490 | 0.172 |
| 7.770 | −5.807 | 0.172 |
| 6.856 | −5.157 | 0.172 |
| 5.891 | −4.551 | 0.172 |

TABLE 1-continued

| X | Y | Z' |
|---|---|---|
| 4.880 | −3.999 | 0.172 |
| 3.830 | −3.511 | 0.172 |
| 2.750 | −3.094 | 0.172 |
| 1.649 | −2.756 | 0.172 |
| 0.548 | −2.501 | 0.172 |
| −0.566 | −2.329 | 0.172 |
| −1.656 | −2.236 | 0.172 |
| −2.718 | −2.215 | 0.172 |
| −3.743 | −2.257 | 0.172 |
| −4.722 | −2.352 | 0.172 |
| −5.650 | −2.486 | 0.172 |
| −6.521 | −2.645 | 0.172 |
| −7.333 | −2.813 | 0.172 |
| −8.088 | −2.968 | 0.172 |
| −8.787 | −3.088 | 0.172 |
| −9.427 | −3.155 | 0.172 |
| −10.005 | −3.163 | 0.172 |
| −10.514 | −3.114 | 0.172 |
| −10.948 | −3.020 | 0.172 |
| −11.302 | −2.890 | 0.172 |
| −11.576 | −2.739 | 0.172 |
| −11.777 | −2.589 | 0.172 |
| −11.915 | −2.457 | 0.172 |
| −12.006 | −2.353 | 0.172 |
| −12.060 | −2.282 | 0.172 |
| −11.946 | −2.159 | 0.216 |
| −11.996 | −2.086 | 0.216 |
| −12.059 | −1.975 | 0.216 |
| −12.136 | −1.794 | 0.216 |
| −12.206 | −1.528 | 0.216 |
| −12.242 | −1.171 | 0.216 |
| −12.217 | −0.724 | 0.216 |
| −12.121 | −0.191 | 0.216 |
| −11.948 | 0.421 | 0.216 |
| −11.688 | 1.105 | 0.216 |
| −11.333 | 1.853 | 0.216 |
| −10.877 | 2.655 | 0.216 |
| −10.308 | 3.496 | 0.216 |
| −9.616 | 4.355 | 0.216 |
| −8.793 | 5.213 | 0.216 |
| −7.836 | 6.043 | 0.216 |
| −6.741 | 6.819 | 0.216 |
| −5.510 | 7.503 | 0.216 |
| −4.149 | 8.055 | 0.216 |
| −2.674 | 8.422 | 0.216 |
| −1.114 | 8.546 | 0.216 |
| 0.478 | 8.375 | 0.216 |
| 2.033 | 7.894 | 0.216 |
| 3.493 | 7.131 | 0.216 |
| 4.823 | 6.142 | 0.216 |
| 6.013 | 4.987 | 0.216 |
| 7.073 | 3.723 | 0.216 |
| 8.018 | 2.392 | 0.216 |
| 8.862 | 1.027 | 0.216 |
| 9.621 | −0.348 | 0.216 |
| 10.307 | −1.711 | 0.216 |
| 10.930 | −3.048 | 0.216 |
| 11.498 | −4.344 | 0.216 |
| 12.018 | −5.589 | 0.216 |
| 12.494 | −6.773 | 0.216 |
| 12.930 | −7.888 | 0.216 |
| 13.329 | −8.928 | 0.216 |
| 13.693 | −9.887 | 0.216 |
| 14.022 | −10.763 | 0.216 |
| 14.334 | −11.545 | 0.216 |
| 14.627 | −12.232 | 0.216 |
| 14.886 | −12.031 | 0.216 |
| 15.103 | −13.347 | 0.216 |
| 15.277 | −13.781 | 0.216 |
| 15.411 | −14.138 | 0.216 |
| 15.510 | −14.419 | 0.216 |
| 15.564 | −14.635 | 0.216 |
| 15.526 | −14.784 | 0.216 |
| 15.464 | −14.859 | 0.216 |
| 15.402 | −14.902 | 0.216 |
| 15.354 | −14.920 | 0.216 |
| 15.287 | −14.932 | 0.216 |
| 15.180 | −14.916 | 0.216 |
| 15.054 | −14.828 | 0.216 |
| 14.936 | −14.657 | 0.216 |
| 14.793 | −14.434 | 0.216 |
| 14.619 | −14.158 | 0.216 |
| 14.413 | −13.827 | 0.216 |
| 14.171 | −13.442 | 0.216 |
| 13.889 | −11.005 | 0.216 |
| 13.567 | −12.515 | 0.216 |
| 13.202 | −11.976 | 0.216 |
| 12.793 | −11.390 | 0.216 |
| 12.338 | −10.762 | 0.216 |
| 11.834 | −10.097 | 0.216 |
| 11.279 | −9.403 | 0.216 |
| 10.679 | −8.681 | 0.216 |
| 10.045 | −7.926 | 0.216 |
| 9.361 | −7.160 | 0.216 |
| 8.606 | −6.412 | 0.216 |
| 7.775 | −5.701 | 0.216 |
| 6.888 | −5.021 | 0.216 |
| 5.948 | −4.381 | 0.216 |
| 4.961 | −3.793 | 0.216 |
| 3.932 | −3.269 | 0.216 |
| 2.869 | −2.817 | 0.216 |
| 1.782 | −2.446 | 0.216 |
| 0.683 | −2.162 | 0.216 |
| −0.417 | −1.968 | 0.216 |
| −1.502 | −1.861 | 0.216 |
| −2.562 | −1.832 | 0.216 |
| −3.584 | −1.872 | 0.216 |
| −4.561 | −1.969 | 0.216 |
| −5.485 | −2.108 | 0.216 |
| −6.352 | −2.276 | 0.216 |
| −7.160 | −2.458 | 0.216 |
| −7.908 | −2.635 | 0.216 |
| −8.598 | −2.786 | 0.216 |
| −9.232 | −2.891 | 0.216 |
| −9.807 | −2.939 | 0.216 |
| −10.317 | −2.928 | 0.216 |
| −10.755 | −2.867 | 0.216 |
| −11.117 | −2.764 | 0.216 |
| −11.401 | −2.635 | 0.216 |
| −11.611 | −2.499 | 0.216 |
| −11.757 | −2.375 | 0.216 |
| −11.852 | −2.276 | 0.216 |
| −11.909 | −2.208 | 0.216 |
| −11.800 | −2.080 | 0.260 |
| −11.853 | −2.009 | 0.260 |
| −11.922 | −1.901 | 0.260 |
| −12.008 | −1.723 | 0.260 |
| −12.093 | −1.460 | 0.260 |
| −12.144 | −1.104 | 0.260 |
| −12.132 | −0.655 | 0.260 |
| −12.045 | −0.120 | 0.260 |
| −11.877 | 0.496 | 0.260 |
| −11.622 | 1.185 | 0.260 |
| −11.275 | 1.939 | 0.260 |
| −10.828 | 2.750 | 0.260 |
| −10.272 | 3.603 | 0.260 |
| −9.596 | 4.479 | 0.260 |
| −8.791 | 5.359 | 0.260 |
| −7.852 | 6.216 | 0.260 |
| −6.773 | 7.020 | 0.260 |
| −5.552 | 7.731 | 0.260 |
| −4.194 | 8.302 | 0.260 |
| −2.715 | 8.675 | 0.260 |
| −1.149 | 8.787 | 0.260 |
| 0.444 | 8.590 | 0.260 |
| 1.995 | 8.077 | 0.260 |
| 3.444 | 7.283 | 0.260 |
| 4.759 | 6.266 | 0.260 |
| 5.935 | 5.090 | 0.260 |
| 6.982 | 3.808 | 0.260 |
| 7.914 | 2.462 | 0.260 |
| 8.748 | 1.084 | 0.260 |
| 9.499 | −0.301 | 0.260 |
| 10.178 | −1.673 | 0.260 |

TABLE 1-continued

| X | Y | Z' |
|---|---|---|
| 10.796 | −3.017 | 0.260 |
| 11.361 | −4.319 | 0.260 |
| 11.880 | −5.569 | 0.260 |
| 12.356 | −6.757 | 0.260 |
| 12.793 | −7.876 | 0.260 |
| 13.193 | −8.919 | 0.260 |
| 13.559 | −9.882 | 0.260 |
| 13.889 | −10.759 | 0.260 |
| 14.202 | −11.544 | 0.260 |
| 14.497 | −12.233 | 0.260 |
| 14.756 | −12.834 | 0.260 |
| 14.974 | −13.352 | 0.260 |
| 15.148 | −13.788 | 0.260 |
| 15.282 | −14.145 | 0.260 |
| 15.382 | −14.428 | 0.260 |
| 15.436 | −14.644 | 0.260 |
| 15.399 | −14.794 | 0.260 |
| 15.337 | −14.870 | 0.260 |
| 15.274 | −14.912 | 0.260 |
| 15.226 | −14.931 | 0.260 |
| 15.159 | −14.942 | 0.260 |
| 15.053 | −14.927 | 0.260 |
| 14.926 | −14.840 | 0.260 |
| 14.808 | −14.670 | 0.260 |
| 14.664 | −14.448 | 0.260 |
| 14.489 | −14.173 | 0.260 |
| 14.282 | −13.844 | 0.260 |
| 14.039 | −13.460 | 0.260 |
| 13.757 | −13.023 | 0.260 |
| 13.436 | −12.534 | 0.260 |
| 13.074 | −11.994 | 0.260 |
| 12.669 | −11.406 | 0.260 |
| 12.221 | −10.775 | 0.260 |
| 11.726 | −10.105 | 0.260 |
| 11.182 | −9.404 | 0.260 |
| 10.597 | −8.671 | 0.260 |
| 9.980 | −7.904 | 0.260 |
| 9.317 | −7.122 | 0.260 |
| 8.586 | −6.352 | 0.260 |
| 7.779 | −5.617 | 0.260 |
| 6.916 | −4.908 | 0.260 |
| 6.001 | −4.237 | 0.260 |
| 5.037 | −3.615 | 0.260 |
| 4.028 | −3.055 | 0.260 |
| 2.983 | −2.568 | 0.260 |
| 1.910 | −2.164 | 0.260 |
| 0.820 | −1.851 | 0.260 |
| −0.273 | −1.633 | 0.260 |
| −1.355 | −1.508 | 0.260 |
| −2.413 | −1.469 | 0.260 |
| −3.434 | −1.504 | 0.260 |
| −4.409 | −1.600 | 0.260 |
| −5.331 | −1.742 | 0.260 |
| −6.196 | −1.917 | 0.260 |
| −6.999 | −2.111 | 0.260 |
| −7.742 | −2.306 | 0.260 |
| −8.425 | −2.484 | 0.260 |
| −9.051 | −2.623 | 0.260 |
| −9.621 | −2.709 | 0.260 |
| −10.129 | −2.734 | 0.260 |
| −10.570 | −2.706 | 0.260 |
| −10.939 | −2.631 | 0.260 |
| −11.231 | −2.523 | 0.260 |
| −11.449 | −2.401 | 0.260 |
| −11.601 | −2.286 | 0.260 |
| −11.701 | −2.192 | 0.260 |
| −11.761 | −2.127 | 0.260 |
| −11.562 | −1.759 | 0.349 |
| −11.620 | −1.692 | 0.349 |
| −11.698 | −1.589 | 0.349 |
| −11.800 | −1.418 | 0.349 |
| −11.907 | −1.162 | 0.349 |
| −11.985 | −0.809 | 0.349 |
| −11.995 | −0.358 | 0.349 |
| −11.922 | 0.183 | 0.349 |
| −11.765 | 0.805 | 0.349 |
| −11.520 | 1.502 | 0.349 |
| −11.183 | 2.267 | 0.349 |
| −10.752 | 3.092 | 0.349 |
| −10.217 | 3.965 | 0.349 |
| −9.567 | 4.869 | 0.349 |
| −8.791 | 5.783 | 0.349 |
| −7.878 | 6.679 | 0.349 |
| −6.820 | 7.522 | 0.349 |
| −5.609 | 8.266 | 0.349 |
| −4.249 | 8.853 | 0.349 |
| −2.759 | 9.217 | 0.349 |
| −1.183 | 9.289 | 0.349 |
| 0.411 | 9.029 | 0.349 |
| 1.947 | 8.446 | 0.349 |
| 3.369 | 7.586 | 0.349 |
| 4.653 | 6.514 | 0.349 |
| 5.799 | 5.295 | 0.349 |
| 6.818 | 3.979 | 0.349 |
| 7.726 | 2.605 | 0.349 |
| 8.540 | 1.205 | 0.349 |
| 9.275 | −0.199 | 0.349 |
| 9.942 | −1.587 | 0.349 |
| 10.552 | −2.944 | 0.349 |
| 11.113 | −4.257 | 0.349 |
| 11.629 | −5.516 | 0.349 |
| 12.106 | −6.712 | 0.349 |
| 12.545 | −7.837 | 0.349 |
| 12.949 | −8.886 | 0.349 |
| 13.318 | −9.853 | 0.349 |
| 13.651 | −10.736 | 0.349 |
| 13.967 | −11.524 | 0.349 |
| 14.263 | −12.218 | 0.349 |
| 14.524 | −12.823 | 0.349 |
| 14.742 | −13.343 | 0.349 |
| 14.917 | −13.782 | 0.349 |
| 15.052 | −14.141 | 0.349 |
| 15.152 | −14.426 | 0.349 |
| 15.208 | −14.643 | 0.349 |
| 15.172 | −14.793 | 0.349 |
| 15.110 | −14.870 | 0.349 |
| 15.047 | −14.913 | 0.349 |
| 14.999 | −14.932 | 0.349 |
| 14.932 | −14.943 | 0.349 |
| 14.825 | −14.929 | 0.349 |
| 14.698 | −14.843 | 0.349 |
| 14.578 | −14.674 | 0.349 |
| 14.432 | −14.453 | 0.349 |
| 14.255 | −14.180 | 0.349 |
| 14.045 | −13.852 | 0.349 |
| 13.800 | −13.470 | 0.349 |
| 13.518 | −13.033 | 0.349 |
| 13.197 | −12.543 | 0.349 |
| 12.838 | −12.001 | 0.349 |
| 12.440 | −11.408 | 0.349 |
| 12.001 | −10.770 | 0.349 |
| 11.520 | −10.090 | 0.349 |
| 10.995 | −9.374 | 0.349 |
| 10.432 | −8.624 | 0.349 |
| 9.845 | −7.834 | 0.349 |
| 9.216 | −7.023 | 0.349 |
| 8.524 | −6.218 | 0.349 |
| 7.759 | −5.439 | 0.349 |
| 6.940 | −4.680 | 0.349 |
| 6.068 | −3.953 | 0.349 |
| 5.146 | −3.270 | 0.349 |
| 4.176 | −2.645 | 0.349 |
| 3.163 | −2.092 | 0.349 |
| 2.116 | −1.623 | 0.349 |
| 1.046 | −1.249 | 0.349 |
| −0.035 | −0.978 | 0.349 |
| −1.112 | −0.811 | 0.349 |
| −2.168 | −0.741 | 0.349 |
| −3.190 | −0.756 | 0.349 |
| −4.166 | −0.840 | 0.349 |
| −5.090 | −0.978 | 0.349 |
| −5.953 | −1.156 | 0.349 |
| −6.754 | −1.361 | 0.349 |
| −7.490 | −1.582 | 0.349 |

TABLE 1-continued

| X | Y | Z' |
|---|---|---|
| −8.162 | −1.798 | 0.349 |
| −8.775 | −1.988 | 0.349 |
| −9.332 | −2.132 | 0.349 |
| −9.834 | −2.218 | 0.349 |
| −10.276 | −2.245 | 0.349 |
| −10.651 | −2.217 | 0.349 |
| −10.954 | −2.146 | 0.349 |
| −11.184 | −2.049 | 0.349 |
| −11.347 | −1.949 | 0.349 |
| −11.455 | −1.864 | 0.349 |
| −11.520 | −1.803 | 0.349 |
| −11.425 | −1.317 | 0.437 |
| −11.487 | −1.253 | 0.437 |
| −11.571 | −1.154 | 0.437 |
| −11.684 | −0.989 | 0.437 |
| −11.806 | −0.739 | 0.437 |
| −11.902 | −0.388 | 0.437 |
| −11.928 | 0.065 | 0.437 |
| −11.866 | 0.609 | 0.437 |
| −11.719 | 1.237 | 0.437 |
| −11.481 | 1.940 | 0.437 |
| −11.153 | 2.713 | 0.437 |
| −10.732 | 3.540 | 0.437 |
| −10.211 | 4.436 | 0.437 |
| −9.575 | 5.356 | 0.437 |
| −8.814 | 6.290 | 0.437 |
| −7.914 | 7.207 | 0.437 |
| −6.860 | 8.067 | 0.437 |
| −5.646 | 8.817 | 0.437 |
| −4.273 | 9.391 | 0.437 |
| −2.767 | 9.717 | 0.437 |
| −1.182 | 9.724 | 0.437 |
| 0.404 | 9.384 | 0.437 |
| 1.916 | 8.720 | 0.437 |
| 3.303 | 7.790 | 0.437 |
| 4.550 | 6.663 | 0.437 |
| 5.662 | 5.402 | 0.437 |
| 6.652 | 4.054 | 0.437 |
| 7.536 | 2.655 | 0.437 |
| 8.331 | 1.235 | 0.437 |
| 9.051 | −0.185 | 0.437 |
| 9.709 | −1.585 | 0.437 |
| 10.313 | −2.953 | 0.437 |
| 10.870 | −4.275 | 0.437 |
| 11.386 | −5.541 | 0.437 |
| 11.863 | −6.744 | 0.437 |
| 12.305 | −7.874 | 0.437 |
| 12.712 | −8.928 | 0.437 |
| 13.084 | −9.899 | 0.437 |
| 13.420 | −10.785 | 0.437 |
| 13.738 | −11.577 | 0.437 |
| 14.036 | −12.274 | 0.437 |
| 14.298 | −12.882 | 0.437 |
| 14.517 | −13.405 | 0.437 |
| 14.694 | −13.845 | 0.437 |
| 14.830 | −14.207 | 0.437 |
| 14.931 | −14.492 | 0.437 |
| 14.988 | −14.710 | 0.437 |
| 14.953 | −14.861 | 0.437 |
| 14.891 | −14.939 | 0.437 |
| 14.828 | −14.982 | 0.437 |
| 14.780 | −15.001 | 0.437 |
| 14.712 | −15.013 | 0.437 |
| 14.605 | −14.998 | 0.437 |
| 14.477 | −14.913 | 0.437 |
| 14.356 | −14.743 | 0.437 |
| 14.208 | −14.523 | 0.437 |
| 14.027 | −14.251 | 0.437 |
| 13.815 | −13.923 | 0.437 |
| 13.568 | −13.540 | 0.437 |
| 13.283 | −13.103 | 0.437 |
| 12.962 | −12.611 | 0.437 |
| 12.604 | −12.066 | 0.437 |
| 12.209 | −11.469 | 0.437 |
| 11.775 | −10.823 | 0.437 |
| 11.303 | −10.134 | 0.437 |
| 10.791 | −9.405 | 0.437 |

TABLE 1-continued

| X | Y | Z' |
|---|---|---|
| 10.244 | −8.639 | 0.437 |
| 9.678 | −7.829 | 0.437 |
| 9.076 | −6.995 | 0.437 |
| 8.414 | −6.161 | 0.437 |
| 7.681 | −5.346 | 0.437 |
| 6.897 | −4.546 | 0.437 |
| 6.062 | −3.771 | 0.437 |
| 5.176 | −3.035 | 0.437 |
| 4.241 | −2.352 | 0.437 |
| 3.260 | −1.738 | 0.437 |
| 2.239 | −1.206 | 0.437 |
| 1.189 | −0.770 | 0.437 |
| 0.120 | −0.440 | 0.437 |
| −0.951 | −0.220 | 0.437 |
| −2.007 | −0.106 | 0.437 |
| −3.032 | −0.085 | 0.437 |
| −4.014 | −0.142 | 0.437 |
| −4.942 | −0.262 | 0.437 |
| −5.811 | −0.429 | 0.437 |
| −6.615 | −0.633 | 0.437 |
| −7.351 | −0.863 | 0.437 |
| −8.018 | −1.100 | 0.437 |
| −8.623 | −1.322 | 0.437 |
| −9.171 | −1.505 | 0.437 |
| −9.666 | −1.633 | 0.437 |
| −10.104 | −1.700 | 0.437 |
| −10.482 | −1.707 | 0.437 |
| −10.791 | −1.662 | 0.437 |
| −11.029 | −1.583 | 0.437 |
| −11.199 | −1.495 | 0.437 |
| −11.312 | −1.416 | 0.437 |
| −11.380 | −1.359 | 0.437 |
| −11.415 | −0.705 | 0.526 |
| −11.480 | −0.643 | 0.526 |
| −11.567 | −0.546 | 0.526 |
| −11.686 | −0.385 | 0.526 |
| −11.816 | −0.137 | 0.526 |
| −11.922 | 0.212 | 0.526 |
| −11.956 | 0.666 | 0.526 |
| −11.902 | 1.214 | 0.526 |
| −11.761 | 1.845 | 0.526 |
| −11.529 | 2.553 | 0.526 |
| −11.205 | 3.331 | 0.526 |
| −10.790 | 4.173 | 0.526 |
| −10.273 | 5.067 | 0.526 |
| −9.640 | 5.995 | 0.526 |
| −8.879 | 6.935 | 0.526 |
| −7.975 | 7.854 | 0.526 |
| −6.910 | 8.708 | 0.526 |
| −5.677 | 9.437 | 0.526 |
| −4.281 | 9.968 | 0.526 |
| −2.756 | 10.223 | 0.526 |
| −1.167 | 10.137 | 0.526 |
| 0.401 | 9.697 | 0.526 |
| 1.876 | 8.944 | 0.526 |
| 3.219 | 7.940 | 0.526 |
| 4.423 | 6.759 | 0.526 |
| 5.499 | 5.458 | 0.526 |
| 6.458 | 4.080 | 0.526 |
| 7.318 | 2.659 | 0.526 |
| 8.095 | 1.221 | 0.526 |
| 8.803 | −0.211 | 0.526 |
| 9.453 | −1.622 | 0.526 |
| 10.052 | −2.997 | 0.526 |
| 10.608 | −4.326 | 0.526 |
| 11.123 | −5.598 | 0.526 |
| 11.602 | −6.805 | 0.526 |
| 12.047 | −7.940 | 0.526 |
| 12.457 | −8.996 | 0.526 |
| 12.831 | −9.971 | 0.526 |
| 13.171 | −10.860 | 0.526 |
| 13.491 | −11.655 | 0.526 |
| 13.790 | −12.354 | 0.526 |
| 14.053 | −12.964 | 0.526 |
| 14.274 | −13.488 | 0.526 |
| 14.452 | −13.930 | 0.526 |
| 14.589 | −14.292 | 0.526 |

TABLE 1-continued

| X | Y | Z' |
|---|---|---|
| 14.691 | −14.579 | 0.526 |
| 14.750 | −14.797 | 0.526 |
| 14.715 | −14.949 | 0.526 |
| 14.653 | −15.027 | 0.526 |
| 14.591 | −15.071 | 0.526 |
| 14.542 | −15.090 | 0.526 |
| 14.474 | −15.102 | 0.526 |
| 14.367 | −15.088 | 0.526 |
| 14.238 | −15.002 | 0.526 |
| 14.116 | −14.832 | 0.526 |
| 13.965 | −14.611 | 0.526 |
| 13.782 | −14.338 | 0.526 |
| 13.567 | −14.010 | 0.526 |
| 13.317 | −13.626 | 0.526 |
| 13.030 | −13.187 | 0.526 |
| 12.707 | −12.693 | 0.526 |
| 12.348 | −12.143 | 0.526 |
| 11.952 | −11.541 | 0.526 |
| 11.521 | −10.890 | 0.526 |
| 11.053 | −10.192 | 0.526 |
| 10.547 | −9.453 | 0.526 |
| 10.012 | −8.672 | 0.526 |
| 9.460 | −7.846 | 0.526 |
| 8.875 | −6.993 | 0.526 |
| 8.233 | −6.136 | 0.526 |
| 7.523 | −5.293 | 0.526 |
| 6.766 | −4.458 | 0.526 |
| 5.960 | −3.644 | 0.526 |
| 5.105 | −2.863 | 0.526 |
| 4.201 | −2.130 | 0.526 |
| 3.250 | −1.459 | 0.526 |
| 2.256 | −0.866 | 0.526 |
| 1.228 | −0.365 | 0.526 |
| 0.175 | 0.030 | 0.526 |
| −0.887 | 0.313 | 0.526 |
| −1.941 | 0.486 | 0.526 |
| −2.970 | 0.558 | 0.526 |
| −3.958 | 0.544 | 0.526 |
| −4.896 | 0.459 | 0.526 |
| −5.774 | 0.316 | 0.526 |
| −6.587 | 0.128 | 0.526 |
| −7.329 | −0.095 | 0.526 |
| −7.998 | −0.337 | 0.526 |
| −8.602 | −0.573 | 0.526 |
| −9.145 | −0.778 | 0.526 |
| −9.636 | −0.932 | 0.526 |
| −10.072 | −1.024 | 0.526 |
| −10.451 | −1.053 | 0.526 |
| −10.764 | −1.024 | 0.526 |
| −11.006 | −0.956 | 0.526 |
| −11.181 | −0.874 | 0.526 |
| −11.297 | −0.800 | 0.526 |
| −11.368 | −0.745 | 0.526 |
| −11.471 | 0.092 | 0.614 |
| −11.537 | 0.153 | 0.614 |
| −11.626 | 0.248 | 0.614 |
| −11.746 | 0.410 | 0.614 |
| −11.878 | 0.657 | 0.614 |
| −11.984 | 1.008 | 0.614 |
| −12.019 | 1.463 | 0.614 |
| −11.969 | 2.013 | 0.614 |
| −11.831 | 2.647 | 0.614 |
| −11.602 | 3.358 | 0.614 |
| −11.280 | 4.140 | 0.614 |
| −10.863 | 4.984 | 0.614 |
| −10.341 | 5.879 | 0.614 |
| −9.699 | 6.804 | 0.614 |
| −8.923 | 7.737 | 0.614 |
| −7.997 | 8.640 | 0.614 |
| −6.904 | 9.464 | 0.614 |
| −5.637 | 10.143 | 0.614 |
| −4.210 | 10.597 | 0.614 |
| −2.667 | 10.747 | 0.614 |
| −1.085 | 10.540 | 0.614 |
| 0.452 | 9.984 | 0.614 |
| 1.879 | 9.133 | 0.614 |
| 3.171 | 8.055 | 0.614 |

TABLE 1-continued

| X | Y | Z' |
|---|---|---|
| 4.327 | 6.820 | 0.614 |
| 5.363 | 5.481 | 0.614 |
| 6.292 | 4.075 | 0.614 |
| 7.129 | 2.635 | 0.614 |
| 7.890 | 1.183 | 0.614 |
| 8.588 | −0.260 | 0.614 |
| 9.232 | −1.678 | 0.614 |
| 9.829 | −3.060 | 0.614 |
| 10.384 | −4.394 | 0.614 |
| 10.901 | −5.670 | 0.614 |
| 11.382 | −6.880 | 0.614 |
| 11.829 | −8.017 | 0.614 |
| 12.242 | −9.077 | 0.614 |
| 12.620 | −10.054 | 0.614 |
| 12.962 | −10.945 | 0.614 |
| 13.284 | −11.741 | 0.614 |
| 13.585 | −12.442 | 0.614 |
| 13.850 | −13.054 | 0.614 |
| 14.072 | −13.580 | 0.614 |
| 14.251 | −14.023 | 0.614 |
| 14.390 | −14.386 | 0.614 |
| 14.494 | −14.672 | 0.614 |
| 14.554 | −14.891 | 0.614 |
| 14.520 | −15.044 | 0.614 |
| 14.458 | −15.122 | 0.614 |
| 14.395 | −15.166 | 0.614 |
| 14.346 | −15.186 | 0.614 |
| 14.278 | −15.198 | 0.614 |
| 14.170 | −15.183 | 0.614 |
| 14.040 | −15.097 | 0.614 |
| 13.917 | −14.926 | 0.614 |
| 13.764 | −14.704 | 0.614 |
| 13.579 | −14.430 | 0.614 |
| 13.361 | −14.100 | 0.614 |
| 13.108 | −13.714 | 0.614 |
| 12.818 | −13.272 | 0.614 |
| 12.492 | −12.774 | 0.614 |
| 12.129 | −12.221 | 0.614 |
| 11.732 | −11.615 | 0.614 |
| 11.299 | −10.957 | 0.614 |
| 10.830 | −10.252 | 0.614 |
| 10.326 | −9.504 | 0.614 |
| 9.795 | −8.712 | 0.614 |
| 9.250 | −7.873 | 0.614 |
| 8.673 | −7.005 | 0.614 |
| 8.042 | −6.130 | 0.614 |
| 7.347 | −5.265 | 0.614 |
| 6.608 | −4.403 | 0.614 |
| 5.823 | −3.557 | 0.614 |
| 4.992 | −2.738 | 0.614 |
| 4.114 | −1.961 | 0.614 |
| 3.190 | −1.239 | 0.614 |
| 2.223 | −0.588 | 0.614 |
| 1.219 | −0.022 | 0.614 |
| 0.187 | 0.444 | 0.614 |
| −0.862 | 0.800 | 0.614 |
| −1.909 | 1.046 | 0.614 |
| −2.938 | 1.187 | 0.614 |
| −3.933 | 1.233 | 0.614 |
| −4.881 | 1.198 | 0.614 |
| −5.771 | 1.096 | 0.614 |
| −6.597 | 0.940 | 0.614 |
| −7.351 | 0.739 | 0.614 |
| −8.031 | 0.509 | 0.614 |
| −8.640 | 0.276 | 0.614 |
| −9.186 | 0.066 | 0.614 |
| −9.677 | −0.099 | 0.614 |
| −10.114 | −0.204 | 0.614 |
| −10.494 | −0.242 | 0.614 |
| −10.810 | −0.219 | 0.614 |
| −11.055 | −0.155 | 0.614 |
| −11.232 | −0.075 | 0.614 |
| −11.351 | −0.002 | 0.614 |
| −11.424 | 0.052 | 0.614 |
| −11.594 | 1.059 | 0.702 |
| −11.660 | 1.120 | 0.702 |
| −11.748 | 1.217 | 0.702 |

TABLE 1-continued

| X | Y | Z' |
|---|---|---|
| −11.865 | 1.381 | 0.702 |
| −11.990 | 1.633 | 0.702 |
| −12.087 | 1.987 | 0.702 |
| −12.116 | 2.444 | 0.702 |
| −12.065 | 2.996 | 0.702 |
| −11.928 | 3.632 | 0.702 |
| −11.698 | 4.346 | 0.702 |
| −11.373 | 5.129 | 0.702 |
| −10.948 | 5.972 | 0.702 |
| −10.411 | 6.862 | 0.702 |
| −9.746 | 7.775 | 0.702 |
| −8.940 | 8.686 | 0.702 |
| −7.975 | 9.554 | 0.702 |
| −6.838 | 10.323 | 0.702 |
| −5.526 | 10.920 | 0.702 |
| −4.064 | 11.262 | 0.702 |
| −2.509 | 11.274 | 0.702 |
| −0.947 | 10.922 | 0.702 |
| 0.542 | 10.238 | 0.702 |
| 1.911 | 9.285 | 0.702 |
| 3.145 | 8.134 | 0.702 |
| 4.251 | 6.847 | 0.702 |
| 5.247 | 5.471 | 0.702 |
| 6.146 | 4.041 | 0.702 |
| 6.963 | 2.583 | 0.702 |
| 7.711 | 1.119 | 0.702 |
| 8.401 | −0.333 | 0.702 |
| 9.042 | −1.759 | 0.702 |
| 9.639 | −3.145 | 0.702 |
| 10.196 | −4.483 | 0.702 |
| 10.716 | −5.762 | 0.702 |
| 11.201 | −6.976 | 0.702 |
| 11.652 | −8.116 | 0.702 |
| 12.068 | −9.177 | 0.702 |
| 12.448 | −10.157 | 0.702 |
| 12.793 | −11.050 | 0.702 |
| 13.118 | −11.848 | 0.702 |
| 13.420 | −12.551 | 0.702 |
| 13.687 | −13.164 | 0.702 |
| 13.912 | −13.691 | 0.702 |
| 14.093 | −14.134 | 0.702 |
| 14.234 | −14.498 | 0.702 |
| 14.339 | −14.785 | 0.702 |
| 14.400 | −15.004 | 0.702 |
| 14.367 | −15.158 | 0.702 |
| 14.305 | −15.237 | 0.702 |
| 14.242 | −15.281 | 0.702 |
| 14.193 | −15.301 | 0.702 |
| 14.124 | −15.313 | 0.702 |
| 14.015 | −15.298 | 0.702 |
| 13.885 | −15.210 | 0.702 |
| 13.760 | −15.037 | 0.702 |
| 13.606 | −14.813 | 0.702 |
| 13.418 | −14.537 | 0.702 |
| 13.197 | −14.205 | 0.702 |
| 12.940 | −13.816 | 0.702 |
| 12.647 | −13.371 | 0.702 |
| 12.317 | −12.869 | 0.702 |
| 11.950 | −12.312 | 0.702 |
| 11.547 | −11.700 | 0.702 |
| 11.108 | −11.037 | 0.702 |
| 10.635 | −10.326 | 0.702 |
| 10.127 | −9.570 | 0.702 |
| 9.594 | −8.769 | 0.702 |
| 9.048 | −7.919 | 0.702 |
| 8.472 | −7.039 | 0.702 |
| 7.840 | −6.151 | 0.702 |
| 7.149 | −5.269 | 0.702 |
| 6.418 | −4.387 | 0.702 |
| 5.646 | −3.515 | 0.702 |
| 4.830 | −2.665 | 0.702 |
| 3.972 | −1.850 | 0.702 |
| 3.071 | −1.083 | 0.702 |
| 2.130 | −0.377 | 0.702 |
| 1.152 | 0.254 | 0.702 |
| 0.144 | 0.794 | 0.702 |
| −0.884 | 1.233 | 0.702 |

TABLE 1-continued

| X | Y | Z' |
|---|---|---|
| −1.918 | 1.564 | 0.702 |
| −2.942 | 1.788 | 0.702 |
| −3.940 | 1.911 | 0.702 |
| −4.897 | 1.944 | 0.702 |
| −5.800 | 1.899 | 0.702 |
| −6.641 | 1.790 | 0.702 |
| −7.412 | 1.629 | 0.702 |
| −8.109 | 1.430 | 0.702 |
| −8.732 | 1.217 | 0.702 |
| −9.288 | 1.018 | 0.702 |
| −9.785 | 0.855 | 0.702 |
| −10.226 | 0.749 | 0.702 |
| −10.610 | 0.712 | 0.702 |
| −10.928 | 0.740 | 0.702 |
| −11.175 | 0.808 | 0.702 |
| −11.353 | 0.890 | 0.702 |
| −11.472 | 0.964 | 0.702 |
| −11.546 | 1.019 | 0.702 |
| −11.794 | 2.193 | 0.791 |
| −11.859 | 2.256 | 0.791 |
| −11.944 | 2.356 | 0.791 |
| −12.055 | 2.526 | 0.791 |
| −12.166 | 2.785 | 0.791 |
| −12.244 | 3.146 | 0.791 |
| −12.260 | 3.606 | 0.791 |
| −12.203 | 4.159 | 0.791 |
| −12.063 | 4.797 | 0.791 |
| −11.830 | 5.513 | 0.791 |
| −11.497 | 6.297 | 0.791 |
| −11.056 | 7.136 | 0.791 |
| −10.493 | 8.014 | 0.791 |
| −9.792 | 8.906 | 0.791 |
| −8.940 | 9.781 | 0.791 |
| −7.921 | 10.593 | 0.791 |
| −6.726 | 11.279 | 0.791 |
| −5.363 | 11.761 | 0.791 |
| −3.868 | 11.957 | 0.791 |
| −2.314 | 11.803 | 0.791 |
| −0.790 | 11.290 | 0.791 |
| 0.638 | 10.471 | 0.791 |
| 1.939 | 9.418 | 0.791 |
| 3.112 | 8.194 | 0.791 |
| 4.169 | 6.857 | 0.791 |
| 5.127 | 5.446 | 0.791 |
| 5.999 | 3.991 | 0.791 |
| 6.799 | 2.516 | 0.791 |
| 7.538 | 1.040 | 0.791 |
| 8.225 | −0.421 | 0.791 |
| 8.867 | −1.853 | 0.791 |
| 9.467 | −3.245 | 0.791 |
| 10.028 | −4.587 | 0.791 |
| 10.553 | −5.871 | 0.791 |
| 11.043 | −7.087 | 0.791 |
| 11.499 | −8.231 | 0.791 |
| 11.919 | −9.296 | 0.791 |
| 12.303 | −10.279 | 0.791 |
| 12.651 | −11.175 | 0.791 |
| 12.978 | −11.976 | 0.791 |
| 13.283 | −12.681 | 0.791 |
| 13.552 | −13.296 | 0.791 |
| 13.779 | −13.824 | 0.791 |
| 13.963 | −14.269 | 0.791 |
| 14.106 | −14.633 | 0.791 |
| 14.214 | −14.920 | 0.791 |
| 14.277 | −15.140 | 0.791 |
| 14.245 | −15.294 | 0.791 |
| 14.183 | −15.374 | 0.791 |
| 14.120 | −15.419 | 0.791 |
| 14.070 | −15.439 | 0.791 |
| 14.001 | −15.452 | 0.791 |
| 13.890 | −15.436 | 0.791 |
| 13.759 | −15.345 | 0.791 |
| 13.633 | −15.170 | 0.791 |
| 13.477 | −14.944 | 0.791 |
| 13.287 | −14.664 | 0.791 |
| 13.063 | −14.328 | 0.791 |
| 12.802 | −13.935 | 0.791 |

TABLE 1-continued

| X | Y | Z' |
|---|---|---|
| 12.505 | −13.485 | 0.791 |
| 12.169 | −12.978 | 0.791 |
| 11.794 | −12.415 | 0.791 |
| 11.383 | −11.799 | 0.791 |
| 10.936 | −11.130 | 0.791 |
| 10.453 | −10.412 | 0.791 |
| 9.935 | −9.650 | 0.791 |
| 9.394 | −8.840 | 0.791 |
| 8.840 | −7.981 | 0.791 |
| 8.253 | −7.092 | 0.791 |
| 7.609 | −6.197 | 0.791 |
| 6.912 | −5.302 | 0.791 |
| 6.179 | −4.404 | 0.791 |
| 5.407 | −3.512 | 0.791 |
| 4.598 | −2.636 | 0.791 |
| 3.752 | −1.788 | 0.791 |
| 2.868 | −0.979 | 0.791 |
| 1.950 | −0.220 | 0.791 |
| 0.999 | 0.474 | 0.791 |
| 0.019 | 1.091 | 0.791 |
| −0.983 | 1.617 | 0.791 |
| −1.996 | 2.043 | 0.791 |
| −3.008 | 2.362 | 0.791 |
| −4.003 | 2.576 | 0.791 |
| −4.965 | 2.691 | 0.791 |
| −5.881 | 2.719 | 0.791 |
| −6.738 | 2.673 | 0.791 |
| −7.528 | 2.569 | 0.791 |
| −8.246 | 2.419 | 0.791 |
| −8.889 | 2.245 | 0.791 |
| −9.462 | 2.072 | 0.791 |
| −9.970 | 1.926 | 0.791 |
| −10.420 | 1.831 | 0.791 |
| −10.809 | 1.807 | 0.791 |
| −11.130 | 1.848 | 0.791 |
| −11.377 | 1.927 | 0.791 |
| −11.554 | 2.017 | 0.791 |
| −11.673 | 2.095 | 0.791 |
| −11.746 | 2.152 | 0.791 |
| −11.920 | 2.818 | 0.835 |
| −11.984 | 2.882 | 0.835 |
| −12.068 | 2.984 | 0.835 |
| −12.173 | 3.158 | 0.835 |
| −12.274 | 3.422 | 0.835 |
| −12.340 | 3.786 | 0.835 |
| −12.346 | 4.248 | 0.835 |
| −12.284 | 4.802 | 0.835 |
| −12.141 | 5.442 | 0.835 |
| −11.906 | 6.159 | 0.835 |
| −11.568 | 6.942 | 0.835 |
| −11.116 | 7.779 | 0.835 |
| −10.535 | 8.650 | 0.835 |
| −9.811 | 9.527 | 0.835 |
| −8.930 | 10.377 | 0.835 |
| −7.879 | 11.153 | 0.835 |
| −6.651 | 11.786 | 0.835 |
| −5.261 | 12.200 | 0.835 |
| −3.753 | 12.312 | 0.835 |
| −2.207 | 12.067 | 0.835 |
| −0.709 | 11.470 | 0.835 |
| 0.684 | 10.584 | 0.835 |
| 1.950 | 9.479 | 0.835 |
| 3.091 | 8.221 | 0.835 |
| 4.124 | 6.858 | 0.835 |
| 5.064 | 5.430 | 0.835 |
| 5.925 | 3.962 | 0.835 |
| 6.718 | 2.478 | 0.835 |
| 7.454 | 0.995 | 0.835 |
| 8.142 | −0.470 | 0.835 |
| 8.785 | −1.906 | 0.835 |
| 9.388 | −3.302 | 0.835 |
| 9.953 | −4.647 | 0.835 |
| 10.482 | −5.933 | 0.835 |
| 10.975 | −7.152 | 0.835 |
| 11.434 | −8.298 | 0.835 |
| 11.857 | −9.366 | 0.835 |
| 12.243 | −10.351 | 0.835 |

TABLE 1-continued

| X | Y | Z' |
|---|---|---|
| 12.592 | −11.249 | 0.835 |
| 12.921 | −12.052 | 0.835 |
| 13.228 | −12.759 | 0.835 |
| 13.499 | −13.375 | 0.835 |
| 13.727 | −13.905 | 0.835 |
| 13.912 | −14.350 | 0.835 |
| 14.057 | −14.715 | 0.835 |
| 14.166 | −15.003 | 0.835 |
| 14.230 | −15.223 | 0.835 |
| 14.198 | −15.378 | 0.835 |
| 14.137 | −15.458 | 0.835 |
| 14.074 | −15.503 | 0.835 |
| 14.024 | −15.523 | 0.835 |
| 13.954 | −15.536 | 0.835 |
| 13.842 | −15.520 | 0.835 |
| 13.711 | −15.428 | 0.835 |
| 13.584 | −15.251 | 0.835 |
| 13.427 | −15.023 | 0.835 |
| 13.236 | −14.741 | 0.835 |
| 13.010 | −14.402 | 0.835 |
| 12.747 | −14.007 | 0.835 |
| 12.447 | −13.553 | 0.835 |
| 12.107 | −13.043 | 0.835 |
| 11.729 | −12.478 | 0.835 |
| 11.312 | −11.858 | 0.835 |
| 10.859 | −11.186 | 0.835 |
| 10.369 | −10.465 | 0.835 |
| 9.843 | −9.700 | 0.835 |
| 9.295 | −8.885 | 0.835 |
| 8.733 | −8.022 | 0.835 |
| 8.137 | −7.130 | 0.835 |
| 7.483 | −6.232 | 0.835 |
| 6.779 | −5.332 | 0.835 |
| 6.040 | −4.427 | 0.835 |
| 5.265 | −3.527 | 0.835 |
| 4.455 | −2.640 | 0.835 |
| 3.611 | −1.776 | 0.835 |
| 2.733 | −0.947 | 0.835 |
| 1.825 | −0.163 | 0.835 |
| 0.886 | 0.563 | 0.835 |
| −0.078 | 1.219 | 0.835 |
| −1.065 | 1.791 | 0.835 |
| −2.065 | 2.266 | 0.835 |
| −3.068 | 2.637 | 0.835 |
| −4.059 | 2.901 | 0.835 |
| −5.022 | 3.061 | 0.835 |
| −5.942 | 3.129 | 0.835 |
| −6.806 | 3.121 | 0.835 |
| −7.607 | 3.051 | 0.835 |
| −8.336 | 2.933 | 0.835 |
| −8.991 | 2.785 | 0.835 |
| −9.574 | 2.632 | 0.835 |
| −10.090 | 2.500 | 0.835 |
| −10.545 | 2.414 | 0.835 |
| −10.938 | 2.401 | 0.835 |
| −11.260 | 2.453 | 0.835 |
| −11.506 | 2.540 | 0.835 |
| −11.682 | 2.635 | 0.835 |
| −11.800 | 2.717 | 0.835 |
| −11.872 | 2.775 | 0.835 |
| −11.920 | 2.818 | 0.835 |
| −12.058 | 3.468 | 0.879 |
| −12.121 | 3.533 | 0.879 |
| −12.202 | 3.638 | 0.879 |
| −12.300 | 3.817 | 0.879 |
| −12.390 | 4.086 | 0.879 |
| −12.442 | 4.454 | 0.879 |
| −12.438 | 4.917 | 0.879 |
| −12.371 | 5.473 | 0.879 |
| −12.225 | 6.115 | 0.879 |
| −11.985 | 6.833 | 0.879 |
| −11.640 | 7.617 | 0.879 |
| −11.176 | 8.451 | 0.879 |
| −10.576 | 9.312 | 0.879 |
| −9.826 | 10.173 | 0.879 |
| −8.913 | 10.996 | 0.879 |
| −7.827 | 11.730 | 0.879 |

TABLE 1-continued

| X | Y | Z' |
|---|---|---|
| −6.566 | 12.306 | 0.879 |
| −5.150 | 12.645 | 0.879 |
| −3.633 | 12.669 | 0.879 |
| −2.098 | 12.333 | 0.879 |
| −0.630 | 11.652 | 0.879 |
| 0.725 | 10.698 | 0.879 |
| 1.954 | 9.544 | 0.879 |
| 3.065 | 8.250 | 0.879 |
| 4.074 | 6.862 | 0.879 |
| 4.998 | 5.416 | 0.879 |
| 5.848 | 3.935 | 0.879 |
| 6.636 | 2.441 | 0.879 |
| 7.371 | 0.951 | 0.879 |
| 8.060 | −0.520 | 0.879 |
| 8.707 | −1.961 | 0.879 |
| 9.314 | −3.360 | 0.879 |
| 9.883 | −4.709 | 0.879 |
| 10.416 | −5.999 | 0.879 |
| 10.913 | −7.222 | 0.879 |
| 11.376 | −8.371 | 0.879 |
| 11.802 | −9.442 | 0.879 |
| 12.190 | −10.430 | 0.879 |
| 12.542 | −11.331 | 0.879 |
| 12.872 | −12.137 | 0.879 |
| 13.181 | −12.846 | 0.879 |
| 13.453 | −13.464 | 0.879 |
| 13.684 | −13.995 | 0.879 |
| 13.871 | −14.442 | 0.879 |
| 14.017 | −14.807 | 0.879 |
| 14.128 | −15.096 | 0.879 |
| 14.193 | −15.316 | 0.879 |
| 14.161 | −15.472 | 0.879 |
| 14.100 | −15.553 | 0.879 |
| 14.037 | −15.598 | 0.879 |
| 13.986 | −15.619 | 0.879 |
| 13.916 | −15.631 | 0.879 |
| 13.803 | −15.614 | 0.879 |
| 13.671 | −15.521 | 0.879 |
| 13.544 | −15.342 | 0.879 |
| 13.386 | −15.112 | 0.879 |
| 13.194 | −14.827 | 0.879 |
| 12.966 | −14.486 | 0.879 |
| 12.701 | −14.087 | 0.879 |
| 12.397 | −13.630 | 0.879 |
| 12.054 | −13.116 | 0.879 |
| 11.670 | −12.547 | 0.879 |
| 11.247 | −11.924 | 0.879 |
| 10.786 | −11.248 | 0.879 |
| 10.288 | −10.524 | 0.879 |
| 9.753 | −9.756 | 0.879 |
| 9.197 | −8.936 | 0.879 |
| 8.626 | −8.069 | 0.879 |
| 8.018 | −7.174 | 0.879 |
| 7.351 | −6.274 | 0.879 |
| 6.637 | −5.369 | 0.879 |
| 5.888 | −4.458 | 0.879 |
| 5.107 | −3.550 | 0.879 |
| 4.294 | −2.652 | 0.879 |
| 3.450 | −1.774 | 0.879 |
| 2.578 | −0.925 | 0.879 |
| 1.678 | −0.115 | 0.879 |
| 0.752 | 0.643 | 0.879 |
| −0.197 | 1.339 | 0.879 |
| −1.167 | 1.957 | 0.879 |
| −2.152 | 2.483 | 0.879 |
| −3.144 | 2.906 | 0.879 |
| −4.129 | 3.220 | 0.879 |
| −5.092 | 3.427 | 0.879 |
| −6.016 | 3.538 | 0.879 |
| −6.887 | 3.569 | 0.879 |
| −7.697 | 3.537 | 0.879 |
| −8.437 | 3.453 | 0.879 |
| −9.104 | 3.335 | 0.879 |
| −9.699 | 3.206 | 0.879 |
| −10.223 | 3.090 | 0.879 |
| −10.684 | 3.016 | 0.879 |
| −11.080 | 3.016 | 0.879 |
| −11.402 | 3.081 | 0.879 |
| −11.647 | 3.177 | 0.879 |
| −11.822 | 3.279 | 0.879 |
| −11.939 | 3.364 | 0.879 |
| −12.011 | 3.424 | 0.879 |
| −12.196 | 4.116 | 0.923 |
| −12.258 | 4.184 | 0.923 |
| −12.336 | 4.291 | 0.923 |
| −12.428 | 4.474 | 0.923 |
| −12.506 | 4.749 | 0.923 |
| −12.543 | 5.120 | 0.923 |
| −12.529 | 5.585 | 0.923 |
| −12.456 | 6.143 | 0.923 |
| −12.306 | 6.786 | 0.923 |
| −12.063 | 7.507 | 0.923 |
| −11.710 | 8.292 | 0.923 |
| −11.232 | 9.123 | 0.923 |
| −10.612 | 9.976 | 0.923 |
| −9.835 | 10.818 | 0.923 |
| −8.890 | 11.613 | 0.923 |
| −7.770 | 12.304 | 0.923 |
| −6.477 | 12.821 | 0.923 |
| −5.039 | 13.085 | 0.923 |
| −3.516 | 13.023 | 0.923 |
| −1.996 | 12.599 | 0.923 |
| −0.558 | 11.839 | 0.923 |
| 0.759 | 10.821 | 0.923 |
| 1.951 | 9.619 | 0.923 |
| 3.032 | 8.289 | 0.923 |
| 4.018 | 6.875 | 0.923 |
| 4.926 | 5.410 | 0.923 |
| 5.767 | 3.915 | 0.923 |
| 6.550 | 2.410 | 0.923 |
| 7.285 | 0.912 | 0.923 |
| 7.976 | −0.566 | 0.923 |
| 8.627 | −2.013 | 0.923 |
| 9.240 | −3.418 | 0.923 |
| 9.814 | −4.771 | 0.923 |
| 10.352 | −6.066 | 0.923 |
| 10.854 | −7.293 | 0.923 |
| 11.320 | −8.447 | 0.923 |
| 11.749 | −9.522 | 0.923 |
| 12.140 | −10.514 | 0.923 |
| 12.494 | −11.419 | 0.923 |
| 12.827 | −12.228 | 0.923 |
| 13.138 | −12.940 | 0.923 |
| 13.412 | −13.560 | 0.923 |
| 13.644 | −14.093 | 0.923 |
| 13.833 | −14.542 | 0.923 |
| 13.982 | −14.908 | 0.923 |
| 14.094 | −15.198 | 0.923 |
| 14.160 | −15.419 | 0.923 |
| 14.129 | −15.576 | 0.923 |
| 14.068 | −15.657 | 0.923 |
| 14.005 | −15.702 | 0.923 |
| 13.954 | −15.723 | 0.923 |
| 13.882 | −15.736 | 0.923 |
| 13.769 | −15.718 | 0.923 |
| 13.636 | −15.623 | 0.923 |
| 13.509 | −15.442 | 0.923 |
| 13.349 | −15.210 | 0.923 |
| 13.155 | −14.922 | 0.923 |
| 12.926 | −14.577 | 0.923 |
| 12.658 | −14.175 | 0.923 |
| 12.351 | −13.713 | 0.923 |
| 12.003 | −13.196 | 0.923 |
| 11.614 | −12.623 | 0.923 |
| 11.185 | −11.995 | 0.923 |
| 10.716 | −11.316 | 0.923 |
| 10.209 | −10.588 | 0.923 |
| 9.664 | −9.816 | 0.923 |
| 9.099 | −8.991 | 0.923 |
| 8.517 | −8.120 | 0.923 |
| 7.895 | −7.221 | 0.923 |
| 7.214 | −6.318 | 0.923 |
| 6.489 | −5.409 | 0.923 |
| 5.731 | −4.492 | 0.923 |

TABLE 1-continued

| X | Y | Z' |
|---|---|---|
| 4.942 | −3.575 | 0.923 |
| 4.124 | −2.667 | 0.923 |
| 3.280 | −1.773 | 0.923 |
| 2.411 | −0.904 | 0.923 |
| 1.520 | −0.068 | 0.923 |
| 0.607 | 0.724 | 0.923 |
| −0.326 | 1.459 | 0.923 |
| −1.278 | 2.122 | 0.923 |
| −2.247 | 2.698 | 0.923 |
| −3.227 | 3.172 | 0.923 |
| −4.206 | 3.535 | 0.923 |
| −5.167 | 3.788 | 0.923 |
| −6.094 | 3.942 | 0.923 |
| −6.971 | 4.011 | 0.923 |
| −7.789 | 4.016 | 0.923 |
| −8.539 | 3.967 | 0.923 |
| −9.217 | 3.880 | 0.923 |
| −9.822 | 3.775 | 0.923 |
| −10.355 | 3.676 | 0.923 |
| −10.822 | 3.616 | 0.923 |
| −11.223 | 3.629 | 0.923 |
| −11.545 | 3.706 | 0.923 |
| −11.789 | 3.812 | 0.923 |
| −11.961 | 3.920 | 0.923 |
| −12.077 | 4.009 | 0.923 |
| −12.149 | 4.071 | 0.923 |
| −12.329 | 4.753 | 0.969 |
| −12.390 | 4.822 | 0.969 |
| −12.465 | 4.932 | 0.968 |
| −12.550 | 5.120 | 0.968 |
| −12.617 | 5.399 | 0.968 |
| −12.641 | 5.773 | 0.968 |
| −12.615 | 6.241 | 0.968 |
| −12.537 | 6.800 | 0.968 |
| −12.384 | 7.447 | 0.968 |
| −12.136 | 8.171 | 0.968 |
| −11.776 | 8.957 | 0.968 |
| −11.284 | 9.785 | 0.968 |
| −10.642 | 10.629 | 0.968 |
| −9.838 | 11.454 | 0.968 |
| −8.862 | 12.220 | 0.968 |
| −7.708 | 12.867 | 0.968 |
| −6.385 | 13.325 | 0.968 |
| −4.928 | 13.516 | 0.968 |
| −3.402 | 13.372 | 0.968 |
| −1.898 | 12.866 | 0.968 |
| −0.493 | 12.032 | 0.968 |
| 0.786 | 10.952 | 0.968 |
| 1.942 | 9.702 | 0.968 |
| 2.993 | 8.337 | 0.968 |
| 3.957 | 6.897 | 0.968 |
| 4.849 | 5.412 | 0.968 |
| 5.681 | 3.902 | 0.968 |
| 6.461 | 2.385 | 0.968 |
| 7.196 | 0.877 | 0.968 |
| 7.891 | −0.609 | 0.968 |
| 8.546 | −2.063 | 0.968 |
| 9.164 | −3.474 | 0.968 |
| 9.745 | −4.834 | 0.968 |
| 10.288 | −6.134 | 0.968 |
| 10.795 | −7.367 | 0.968 |
| 11.265 | −8.526 | 0.968 |
| 11.698 | −9.606 | 0.968 |
| 12.092 | −10.603 | 0.968 |
| 12.449 | −11.513 | 0.968 |
| 12.784 | −12.326 | 0.968 |
| 13.097 | −13.041 | 0.968 |
| 13.373 | −13.665 | 0.968 |
| 13.608 | −14.200 | 0.968 |
| 13.799 | −14.650 | 0.968 |
| 13.949 | −15.018 | 0.968 |
| 14.063 | −15.309 | 0.968 |
| 14.130 | −15.531 | 0.968 |
| 14.101 | −15.689 | 0.968 |
| 14.039 | −15.770 | 0.968 |
| 13.976 | −15.816 | 0.968 |
| 13.924 | −15.838 | 0.968 |
| 13.852 | −15.851 | 0.968 |
| 13.738 | −15.832 | 0.968 |
| 13.605 | −15.734 | 0.968 |
| 13.476 | −15.552 | 0.968 |
| 13.315 | −15.316 | 0.968 |
| 13.120 | −15.026 | 0.968 |
| 12.888 | −14.677 | 0.968 |
| 12.617 | −14.271 | 0.968 |
| 12.307 | −13.805 | 0.968 |
| 11.955 | −13.283 | 0.968 |
| 11.559 | −12.705 | 0.968 |
| 11.123 | −12.074 | 0.968 |
| 10.646 | −11.390 | 0.968 |
| 10.130 | −10.658 | 0.968 |
| 9.575 | −9.880 | 0.968 |
| 9.001 | −9.050 | 0.968 |
| 8.406 | −8.174 | 0.968 |
| 7.771 | −7.271 | 0.968 |
| 7.075 | −6.366 | 0.968 |
| 6.338 | −5.450 | 0.968 |
| 5.570 | −4.527 | 0.968 |
| 4.772 | −3.601 | 0.968 |
| 3.949 | −2.680 | 0.968 |
| 3.104 | −1.770 | 0.968 |
| 2.240 | −0.880 | 0.968 |
| 1.358 | −0.017 | 0.968 |
| 0.458 | 0.808 | 0.968 |
| −0.458 | 1.582 | 0.968 |
| −1.393 | 2.291 | 0.968 |
| −2.346 | 2.914 | 0.968 |
| −3.313 | 3.436 | 0.968 |
| −4.285 | 3.846 | 0.968 |
| −5.244 | 4.143 | 0.968 |
| −6.172 | 4.337 | 0.968 |
| −7.055 | 4.445 | 0.968 |
| −7.880 | 4.486 | 0.968 |
| −8.639 | 4.471 | 0.968 |
| −9.327 | 4.413 | 0.968 |
| −9.942 | 4.332 | 0.968 |
| −10.484 | 4.251 | 0.968 |
| −10.957 | 4.203 | 0.968 |
| −11.361 | 4.230 | 0.968 |
| −11.683 | 4.320 | 0.968 |
| −11.926 | 4.436 | 0.968 |
| −12.097 | 4.550 | 0.968 |
| −12.212 | 4.643 | 0.968 |
| −12.283 | 4.707 | 0.968 |
| −12.424 | 5.207 | 1.000 |
| −12.484 | 5.278 | 1.000 |
| −12.556 | 5.391 | 1.000 |
| −12.637 | 5.581 | 1.000 |
| −12.696 | 5.863 | 1.000 |
| −12.711 | 6.239 | 1.000 |
| −12.678 | 6.709 | 1.000 |
| −12.596 | 7.270 | 1.000 |
| −12.441 | 7.920 | 1.000 |
| −12.191 | 8.646 | 1.000 |
| −11.825 | 9.434 | 1.000 |
| −11.323 | 10.261 | 1.000 |
| −10.667 | 11.100 | 1.000 |
| −9.842 | 11.912 | 1.000 |
| −8.843 | 12.657 | 1.000 |
| −7.665 | 13.273 | 1.000 |
| −6.322 | 13.689 | 1.000 |
| −4.852 | 13.828 | 1.000 |
| −3.326 | 13.628 | 1.000 |
| −1.835 | 13.065 | 1.000 |
| −0.452 | 12.180 | 1.000 |
| 0.800 | 11.057 | 1.000 |
| 1.930 | 9.773 | 1.000 |
| 2.959 | 8.382 | 1.000 |
| 3.907 | 6.922 | 1.000 |
| 4.789 | 5.421 | 1.000 |
| 5.615 | 3.898 | 1.000 |
| 6.392 | 2.372 | 1.000 |
| 7.128 | 0.856 | 1.000 |
| 7.825 | −0.638 | 1.000 |

TABLE 1-continued

| X | Y | Z' |
|---|---|---|
| 8.485 | −2.097 | 1.000 |
| 9.107 | −3.514 | 1.000 |
| 9.692 | −4.879 | 1.000 |
| 10.240 | −6.185 | 1.000 |
| 10.751 | −7.423 | 1.000 |
| 11.225 | −8.586 | 1.000 |
| 11.661 | −9.671 | 1.000 |
| 12.057 | −10.672 | 1.000 |
| 12.416 | −11.586 | 1.000 |
| 12.754 | −12.402 | 1.000 |
| 13.068 | −13.121 | 1.000 |
| 13.347 | −13.747 | 1.000 |
| 13.583 | −14.284 | 1.000 |
| 13.775 | −14.736 | 1.000 |
| 13.927 | −15.106 | 1.000 |
| 14.042 | −15.397 | 1.000 |
| 14.110 | −15.620 | 1.000 |
| 14.082 | −15.779 | 1.000 |
| 14.020 | −15.861 | 1.000 |
| 13.956 | −15.907 | 1.000 |
| 13.905 | −15.929 | 1.000 |
| 13.832 | −15.942 | 1.000 |
| 13.717 | −15.922 | 1.000 |
| 13.583 | −15.823 | 1.000 |
| 13.454 | −15.639 | 1.000 |
| 13.292 | −15.401 | 1.000 |
| 13.096 | −15.108 | 1.000 |
| 12.862 | −14.757 | 1.000 |
| 12.588 | −14.348 | 1.000 |
| 12.276 | −13.878 | 1.000 |
| 11.920 | −13.353 | 1.000 |
| 11.520 | −12.772 | 1.000 |
| 11.078 | −12.136 | 1.000 |
| 10.595 | −11.449 | 1.000 |
| 10.072 | −10.713 | 1.000 |
| 9.509 | −9.932 | 1.000 |
| 8.929 | −9.097 | 1.000 |
| 8.326 | −8.216 | 1.000 |
| 7.679 | −7.311 | 1.000 |
| 6.971 | −6.403 | 1.000 |
| 6.225 | −5.484 | 1.000 |
| 5.449 | −4.554 | 1.000 |
| 4.645 | −3.621 | 1.000 |
| 3.818 | −2.691 | 1.000 |
| 2.973 | −1.769 | 1.000 |
| 2.111 | −0.861 | 1.000 |
| 1.236 | 0.022 | 1.000 |
| 0.346 | 0.871 | 1.000 |
| −0.557 | 1.675 | 1.000 |
| −1.478 | 2.415 | 1.000 |
| −2.420 | 3.072 | 1.000 |
| −3.379 | 3.627 | 1.000 |
| −4.345 | 4.069 | 1.000 |
| −5.302 | 4.397 | 1.000 |
| −6.232 | 4.618 | 1.000 |
| −7.118 | 4.752 | 1.000 |
| −7.948 | 4.818 | 1.000 |
| −8.714 | 4.826 | 1.000 |
| −9.409 | 4.788 | 1.000 |
| −10.030 | 4.723 | 1.000 |
| −10.578 | 4.653 | 1.000 |
| −11.056 | 4.616 | 1.000 |
| −11.461 | 4.653 | 1.000 |
| −11.783 | 4.755 | 1.000 |
| −12.024 | 4.978 | 1.000 |
| −12.193 | 4.998 | 1.000 |
| −12.307 | 5.094 | 1.000 |
| −12.378 | 5.160 | 1.000 |

In the above table, the plane Z'=0 corresponds to a reference plane P0 situated at the base of the profile, i.e. level with the platform connecting it to the root of the blade.

As mentioned in the beginning of the present description, the aerodynamic profile of the invention is substantially identical to the nominal profile defined in the above table, i.e. it departs at most only very little from the nominal profile, in particular it lies within an envelope of ±1 mm in a direction normal to the surface of the nominal profile, and/or it has X,Y coordinates that lie within a range of ±5% relative to the X,Y coordinates of the nominal profile.

The coordinates in the above table are given from a value Z'=0, i.e. in the reference plane P0. The Z' coordinate is non-dimensional, i.e. for a point P1 situated at a distance D from the plane P0 (D thus being measured along the Z axis), the value of Z' is D/H where H represents the total height of the profile, measured from the plane P0 to the tip of the profile. Naturally, multiplying the Z' coordinate in the above table by the height H gives the full coordinates of the blade.

In the above table, the profile is characterized by 18 sections at constant Z' coordinate, for which the X and Y coordinates are specified. In each section plane at constant Z' coordinate, the section of the profile is given by a continuous and smooth curve interconnecting each of the points (X,Y). In each section plane, the profile is interpolated so as to generate a uniform profile.

Figure 2:
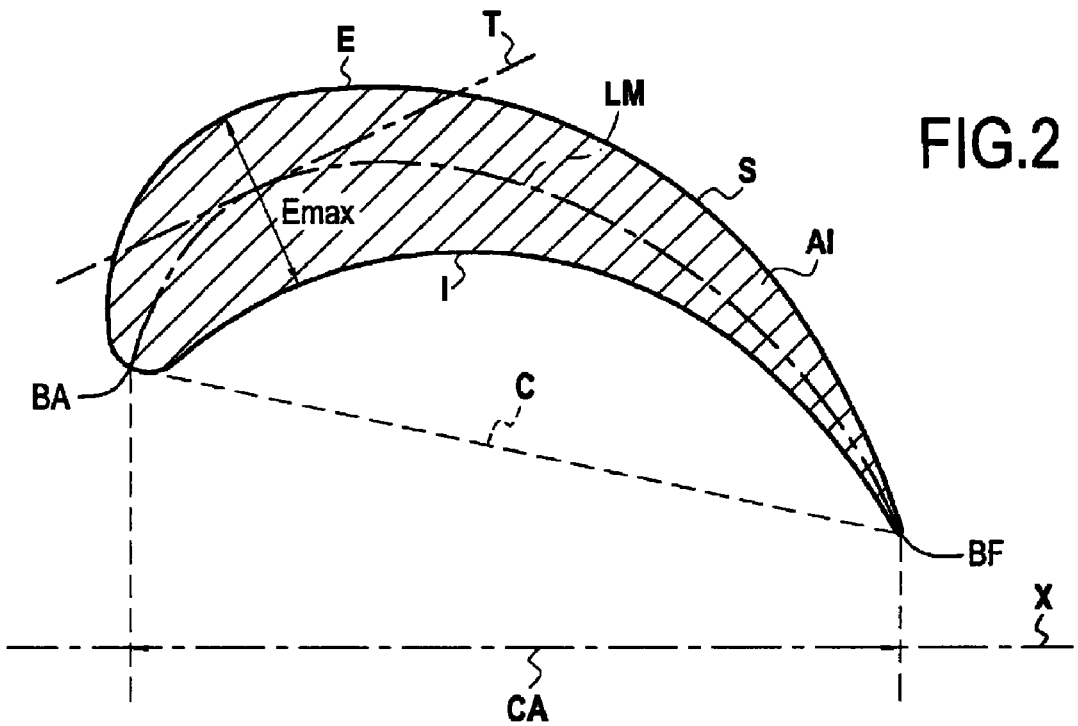
FIG. 2 is a section view of the FIG. 1 profile, in an X,Y plane.

In FIG. 2, there can be seen a diagrammatic section of the profile 16 in an X,Y plane parallel to the plane P0. This section shows the leading edge BA, and the trailing edge BF. In this section, the chord C of the profile is determined by the segment interconnecting the points BA and BF. The axial chord CA of the profile is the projection onto the X axis of said segment C. Advantageously, the relationship between the non-dimensional Z' coordinate and said axial chord CA for the nominal profile from which the profile of the invention is determined complies with the curve of FIG. 3.

In FIG. 2, the outline of the nominal profile in the X,Y plane in question presents a continuous curve S. The inside area AI of this outline is the area of the surface defined by the curve S. Advantageously, the relationship between the Z' coordinate and said inside area AI for the nominal profile complies with the curve of FIG. 4.

The value Emax given in FIG. 2 is the maximum thickness of the blade profile in the X,Y plane under consideration. By convention, this maximum thickness is determined in each X,Y plane as being the length of the longest segment orthogonally intersecting a tangent T to the midline LM of the profile. This midline, also referred to as the framework or skeleton, is the line made up of all points that are equidistant from the suction side E and the pressure side I of the profile.

Figure 5:
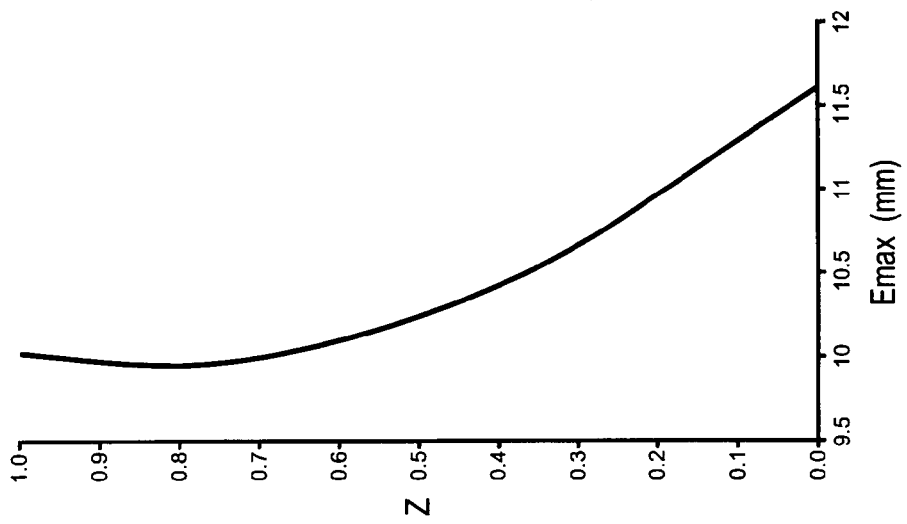
FIG. 5 shows the relationship between the Z' coordinate and the maximum thickness of the nominal profile, measured in an X,Y plane.

Preferably, the relationship between the Z' coordinate and said maximum thickness Emax of the nominal profile complies with the curve of FIG. 5.

Figure 4:
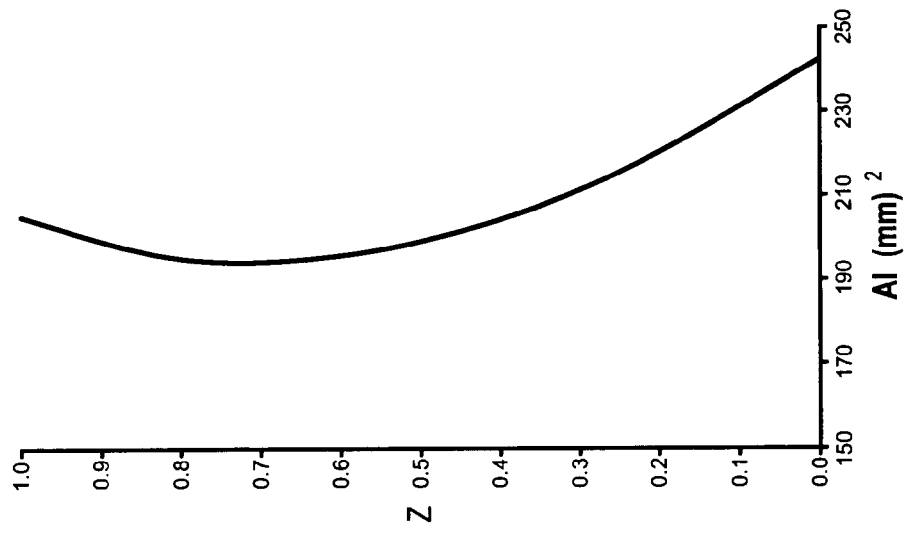
FIG. 4 shows the relationship between the Z' coordinate and the inside area defined by the outline of the nominal profile in an X,Y plane.
Figure 3:
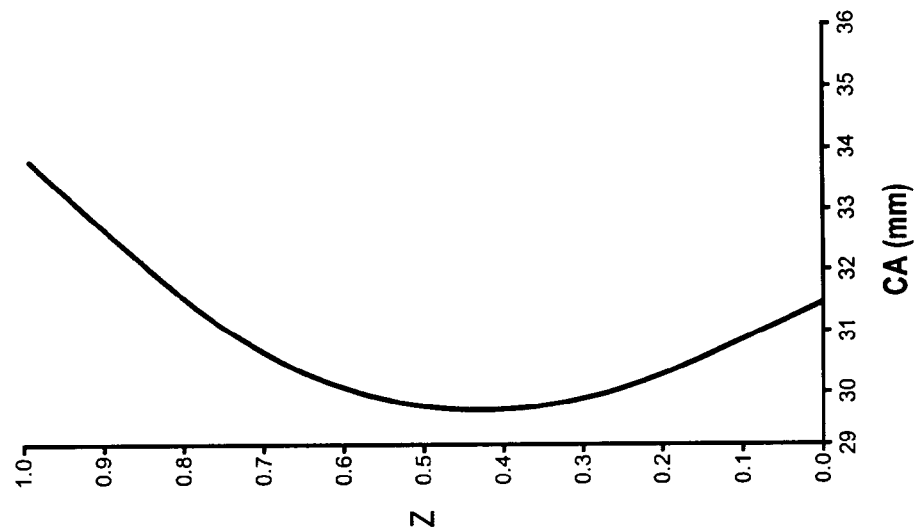
FIG. 3 shows the relationship between the axial chord of the nominal profile and the Z' coordinate.

The variations in the axial chord CA, the area AI, and the maximum thickness Emax given above with reference to the curves of FIGS. 3, 4, and 5 contribute to optimizing the aerodynamic profile of the invention.

A turbine blade, in particular for a moving turbine wheel, presenting an aerodynamic profile as defined above with reference to Table 1 and the curves of FIGS. 3 to 5 serve to optimize the flow of air in the vicinity of the aerodynamic profile and the transformation of the kinetic energy in the air flowing in this way into mechanical energy on a shaft driven by the moving wheel.

It is advantageous for the moving wheel to have 60 to 68 blades, each having an aerodynamic profile in accordance with the invention.

What is claimed is:

1. An aerodynamic profile for a turbine blade, said profile, when cold and in a non-coated state, being substantially identical to a nominal profile determined by the rectangular coordinates X,Y,Z' given in Table 1, in which the X coordinate is measured in the axial direction of the turbine, and the Z' coordinate is the quotient D/H, where D is the distance of the point in question from a reference plane P0 situated at the base of the nominal profile and H is the height of the profile measured from said reference plane to the tip of the blade, the measurements D and H being taken radially relative to the axis of the turbine.

2. An aerodynamic profile according to claim 1, wherein the relationship between the Z' coordinate and the axial chord CA of the nominal profile complies with the curve of FIG. 3.

3. An aerodynamic profile according to claim 1, wherein the relationship between the Z' coordinate and the inside area defined by the outline of the nominal profile in an X,Y plane complies with the curve of FIG. 4.

4. An aerodynamic profile according to claim 1, wherein the relationship between the Z' coordinate and the maximum thickness Emax of the nominal profile measured in an X,Y plane complies with the curve of FIG. 5.

5. An aerodynamic profile according to claim 1, said profile being defined in an envelope of ±1 mm in a direction normal to the surface of the nominal profile.

6. An aerodynamic profile according to claim 1, wherein the X,Y coordinates of said profile lie within ±5% relative to the X,Y coordinates of the nominal profile.

7. A turbine blade, presenting an aerodynamic profile according to claim 1.

8. A turbine, including turbine blades presenting aerodynamic profiles according to claim 1.

9. A turbine according to claim 8, including a moving wheel having 60 to 68 of said turbine blades.

* * * * *